US008538864B2

(12) United States Patent
Von Der Emde et al.

(10) Patent No.: US 8,538,864 B2
(45) Date of Patent: *Sep. 17, 2013

(54) PROVIDING PAYMENT SOFTWARE APPLICATION AS ENTERPRISE SERVICES

(75) Inventors: Martin Von Der Emde, Wiesloch (DE); Thomas Hoffmann, Roemerberg (DE); Dietmar Nowotny, Dielheim (DE); Jan Penning, Heidelberg (DE); Bernhard F. Kuhn, Bammental (DE)

(73) Assignee: SAP AG, Walldorf (DE)

( * ) Notice: Subject to any disclaimer, the term of this patent is extended or adjusted under 35 U.S.C. 154(b) by 856 days.

This patent is subject to a terminal disclaimer.

(21) Appl. No.: 11/396,288

(22) Filed: Mar. 30, 2006

(65) Prior Publication Data

US 2007/0233598 A1    Oct. 4, 2007

(51) Int. Cl.
*G06Q 40/00* (2012.01)
*G07F 19/00* (2006.01)

(52) U.S. Cl.
USPC .............................. 705/38; 705/30

(58) Field of Classification Search
USPC ....................................... 705/35–42
See application file for complete search history.

(56) References Cited

U.S. PATENT DOCUMENTS

| | | |
|---|---|---|
| 4,947,321 A | 8/1990 | Spence et al. |
| 5,361,198 A | 11/1994 | Harmon et al. |
| 5,550,734 A | 8/1996 | Tarter et al. |
| 5,560,005 A | 9/1996 | Hoover et al. |
| 5,566,097 A | 10/1996 | Myers et al. |
| 5,586,312 A | 12/1996 | Johnson et al. |
| 5,590,277 A | 12/1996 | Fuchs et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,710,917 A | 1/1998 | Musa et al. |
| 5,768,119 A | 6/1998 | Havekost et al. |
| 5,822,585 A | 10/1998 | Noble et al. |
| 5,832,218 A | 11/1998 | Gibbs et al. |
| 5,848,291 A | 12/1998 | Milne et al. |
| 5,867,495 A | 2/1999 | Elliott et al. |
| 5,870,588 A | 2/1999 | Rompaey et al. |
| 5,881,230 A | 3/1999 | Christensen et al. |
| 5,893,106 A | 4/1999 | Brobst et al. |
| 5,898,872 A | 4/1999 | Richley |
| 5,918,219 A | 6/1999 | Isherwood |

(Continued)

FOREIGN PATENT DOCUMENTS

| | | |
|---|---|---|
| WO | 00/23874 | 4/2000 |
| WO | 2000/023874 | 4/2000 |
| WO | WO 2004/083984 | 9/2004 |
| WO | WO 2005/114381 | 12/2005 |

OTHER PUBLICATIONS

"Hudsons' Bay Company Realizes Fast ROI with the Oracle E-Business Suite". PR Newswire. New York: Jan. 15, 2002. p. 1.*

(Continued)

*Primary Examiner* — Mohammad Z Shaikh
(74) *Attorney, Agent, or Firm* — Fish & Richardson P.C.

(57) ABSTRACT

Methods and apparatus, including systems and computer program products, for a service architecture design that provides enterprise services having payment functionality at the level of an enterprise application. The design includes a set of service operations, process components, and optionally deployment units. Suitable business objects are also described.

18 Claims, 18 Drawing Sheets

(56) References Cited

U.S. PATENT DOCUMENTS

| | | | |
|---|---|---|---|
| 5,987,247 | A | 11/1999 | Lau |
| 5,991,536 | A | 11/1999 | Brodsky et al. |
| H001830 | H | 1/2000 | Petrimoulx et al. |
| 6,028,997 | A | 2/2000 | Leymann et al. |
| 6,038,393 | A | 3/2000 | Iyengar et al. |
| 6,049,838 | A | 4/2000 | Miller et al. |
| 6,067,559 | A | 5/2000 | Allard et al. |
| 6,070,197 | A | 5/2000 | Cobb et al. |
| 6,112,024 | A | 8/2000 | Almond et al. |
| 6,151,582 | A | 11/2000 | Huang et al. |
| 6,167,563 | A | 12/2000 | Fontana et al. |
| 6,167,564 | A | 12/2000 | Fontana et al. |
| 6,177,932 | B1 | 1/2001 | Galdes et al. |
| 6,182,133 | B1 | 1/2001 | Horvitz |
| 6,192,390 | B1 | 2/2001 | Berger et al. |
| 6,208,345 | B1 | 3/2001 | Sheard et al. |
| 6,237,136 | B1 | 5/2001 | Sadhiro |
| 6,272,672 | B1 | 8/2001 | Conway |
| 6,311,170 | B1 | 10/2001 | Embrey |
| 6,338,097 | B1 | 1/2002 | Krenzke et al. |
| 6,424,991 | B1 | 7/2002 | Gish |
| 6,434,740 | B1 | 8/2002 | Monday et al. |
| 6,442,748 | B1 | 8/2002 | Bowman-Amuah |
| 6,445,782 | B1 | 9/2002 | Elfe et al. |
| 6,446,045 | B1 | 9/2002 | Stone et al. |
| 6,446,092 | B1 | 9/2002 | Sutter |
| 6,473,794 | B1 | 10/2002 | Guheen et al. |
| 6,493,716 | B1 | 12/2002 | Azagury et al. |
| 6,571,220 | B1 | 5/2003 | Ogino et al. |
| 6,594,535 | B1 | 7/2003 | Costanza |
| 6,601,233 | B1 | 7/2003 | Underwood |
| 6,601,234 | B1 | 7/2003 | Bowman-Amuah |
| 6,606,744 | B1 | 8/2003 | Mikurak |
| 6,609,100 | B2 | 8/2003 | Smith et al. |
| 6,640,238 | B1 | 10/2003 | Bowman-Amuah |
| 6,671,673 | B1 | 12/2003 | Baseman et al. |
| 6,678,882 | B1 | 1/2004 | Hurley et al. |
| 6,687,734 | B1 | 2/2004 | Sellink et al. |
| 6,691,151 | B1 | 2/2004 | Cheyer et al. |
| 6,721,783 | B1 | 4/2004 | Blossman et al. |
| 6,738,964 | B1 | 5/2004 | Zink et al. |
| 6,747,679 | B1 | 6/2004 | Finch et al. |
| 6,750,885 | B1 | 6/2004 | Finch et al. |
| 6,757,837 | B1 | 6/2004 | Platt et al. |
| 6,764,009 | B2 | 7/2004 | Melick et al. |
| 6,772,216 | B1 | 8/2004 | Ankireddipally et al. |
| 6,782,536 | B2 | 8/2004 | Moore et al. |
| 6,789,252 | B1 | 9/2004 | Burke et al. |
| 6,845,499 | B2 | 1/2005 | Srivastava et al. |
| 6,847,854 | B2 | 1/2005 | Discenzo |
| 6,859,931 | B1 | 2/2005 | Cheyer et al. |
| 6,889,197 | B2 | 5/2005 | Lidow |
| 6,889,375 | B1 | 5/2005 | Chan et al. |
| 6,895,438 | B1 | 5/2005 | Ulrich |
| 6,898,783 | B1 | 5/2005 | Gupta et al. |
| 6,904,399 | B2 | 6/2005 | Cooper et al. |
| 6,907,395 | B1 | 6/2005 | Hunt et al. |
| 6,954,736 | B2 | 10/2005 | Menninger et al. |
| 6,985,939 | B2 | 1/2006 | Fletcher et al. |
| 6,990,466 | B1 | 1/2006 | Hu |
| 7,003,474 | B2 | 2/2006 | Lidow |
| 7,031,998 | B2 | 4/2006 | Archbold |
| 7,043,448 | B2 | 5/2006 | Campbell |
| 7,047,518 | B2 | 5/2006 | Little et al. |
| 7,050,056 | B2 | 5/2006 | Meyringer |
| 7,050,873 | B1 | 5/2006 | Discenzo |
| 7,055,136 | B2 | 5/2006 | Dzoba et al. |
| 7,058,587 | B1 | 6/2006 | Horne |
| 7,069,536 | B2 | 6/2006 | Yaung |
| 7,072,855 | B1 | 7/2006 | Godlewski et al. |
| 7,076,766 | B2 | 7/2006 | Wirts et al. |
| 7,100,195 | B1 | 8/2006 | Underwood |
| 7,103,873 | B2 | 9/2006 | Tanner et al. |
| 7,117,447 | B2 | 10/2006 | Cobb et al. |
| 7,120,597 | B1 | 10/2006 | Knudtzon et al. |
| 7,120,896 | B2 | 10/2006 | Budhiraja et al. |
| 7,131,069 | B1 | 10/2006 | Rush et al. |
| 7,149,887 | B2 | 12/2006 | Morrison et al. |
| 7,155,403 | B2 | 12/2006 | Cirulli et al. |
| 7,155,409 | B1 | 12/2006 | Stroh |
| 7,181,694 | B2 | 2/2007 | Reiss et al. |
| 7,184,964 | B2 | 2/2007 | Wang |
| 7,194,431 | B1 | 3/2007 | Land et al. |
| 7,197,740 | B2 | 3/2007 | Beringer et al. |
| 7,200,569 | B2 | 4/2007 | Gallagher et al. |
| 7,206,768 | B1 | 4/2007 | deGroeve et al. |
| 7,213,232 | B1 | 5/2007 | Knowles |
| 7,216,091 | B1 | 5/2007 | Blandina et al. |
| 7,219,107 | B2 | 5/2007 | Beringer |
| 7,222,786 | B2 | 5/2007 | Renz et al. |
| 7,225,240 | B1 | 5/2007 | Fox et al. |
| 7,249,044 | B2 | 7/2007 | Kumar et al. |
| 7,257,254 | B2 | 8/2007 | Tunney |
| 7,283,973 | B1 | 10/2007 | Loghmani et al. |
| 7,293,254 | B2 | 11/2007 | Bloesch et al. |
| 7,299,970 | B1 | 11/2007 | Ching |
| 7,315,830 | B1 | 1/2008 | Wirtz et al. |
| 7,322,024 | B2 | 1/2008 | Carlson et al. |
| 7,324,966 | B2 | 1/2008 | Scheer |
| 7,353,180 | B1 | 4/2008 | Silverstone et al. |
| 7,356,492 | B2 | 4/2008 | Hazi et al. |
| 7,367,011 | B2 | 4/2008 | Ramsey et al. |
| 7,370,315 | B1 | 5/2008 | Lovell et al. |
| 7,376,601 | B1 | 5/2008 | Aldridge |
| 7,376,604 | B1 | 5/2008 | Butcher |
| 7,376,632 | B1 | 5/2008 | Sadek et al. |
| 7,383,201 | B2 | 6/2008 | Matsuzaki et al. |
| 7,386,833 | B2 | 6/2008 | Granny et al. |
| 7,406,716 | B2 | 7/2008 | Kanamori et al. |
| 7,415,697 | B1 | 8/2008 | Houlding |
| 7,418,409 | B1 | 8/2008 | Goel |
| 7,418,424 | B2 | 8/2008 | Martin et al. |
| 7,424,701 | B2 | 9/2008 | Kendall et al. |
| 7,433,979 | B2 | 10/2008 | Need |
| 7,448,022 | B1 | 11/2008 | Ram et al. |
| 7,451,432 | B2 | 11/2008 | Shukla et al. |
| 7,460,654 | B1 | 12/2008 | Jenkins et al. |
| 7,461,030 | B2 | 12/2008 | Hibler et al. |
| 7,469,233 | B2 | 12/2008 | Shooks et al. |
| 7,516,088 | B2 | 4/2009 | Johnson et al. |
| 7,523,054 | B2 | 4/2009 | Tyson-Quah |
| 7,529,699 | B2 | 5/2009 | Fuse et al. |
| 7,536,325 | B2 | 5/2009 | Randell et al. |
| 7,536,354 | B1 | 5/2009 | deGroeve et al. |
| 7,546,520 | B2 | 6/2009 | Davidson et al. |
| 7,546,575 | B1 | 6/2009 | Dillman et al. |
| 7,565,640 | B2 | 7/2009 | Shukla et al. |
| 7,574,511 | B2 * | 8/2009 | Pujol et al. .................... 709/229 |
| 7,574,694 | B2 | 8/2009 | Mangan et al. |
| 7,624,371 | B2 | 11/2009 | Kulkarni et al. |
| 7,631,291 | B2 | 12/2009 | Shukla et al. |
| 7,640,195 | B2 | 12/2009 | Von Zimmermann et al. |
| 7,640,291 | B2 | 12/2009 | Maturana et al. |
| 7,644,390 | B2 | 1/2010 | Khodabandehloo et al. |
| 7,657,406 | B2 | 2/2010 | Tolone et al. |
| 7,657,445 | B1 | 2/2010 | Goux |
| 7,665,083 | B2 | 2/2010 | Demant et al. |
| 7,668,761 | B2 | 2/2010 | Jenkins et al. |
| 7,672,888 | B2 | 3/2010 | Allin et al. |
| 7,681,176 | B2 | 3/2010 | Willis et al. |
| 7,693,586 | B2 | 4/2010 | Dumas et al. |
| 7,703,073 | B2 | 4/2010 | Illowsky et al. |
| 7,739,160 | B1 | 6/2010 | Ryan et al. |
| 7,742,985 | B1 | 6/2010 | Digrigoli et al. |
| 7,747,980 | B2 | 6/2010 | Illowsky et al. |
| 7,761,848 | B1 * | 7/2010 | Chaffin .................... 717/116 |
| 7,765,156 | B2 | 7/2010 | Staniar et al. |
| 7,765,521 | B2 | 7/2010 | Bryant |
| 7,788,145 | B2 | 8/2010 | Wadawadigi et al. |
| 7,788,319 | B2 * | 8/2010 | Schmidt et al. .................... 709/203 |
| 7,793,256 | B2 * | 9/2010 | Charisius et al. .................... 717/103 |
| 7,793,258 | B2 | 9/2010 | Sundararajan et al. |
| 7,797,698 | B2 | 9/2010 | Diament et al. |
| 7,814,142 | B2 | 10/2010 | Mamou et al. |

| Patent/Pub No. | Date | Inventor |
|---|---|---|
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,010,938 B2 | 8/2011 | Elaasar |
| 8,051,332 B2 | 11/2011 | Zakonov et al. |
| 8,091,065 B2 | 1/2012 | Mir et al. |
| 8,112,738 B2 | 2/2012 | Pohl et al. |
| 8,316,344 B2 * | 11/2012 | Kaetker et al. ............... 717/104 |
| 8,442,850 B2 * | 5/2013 | Schorr et al. ............... 705/7.12 |
| 8,448,137 B2 * | 5/2013 | Kaetker et al. ............... 717/121 |
| 2001/0032106 A1 * | 10/2001 | Smith et al. ............... 705/7 |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 * | 8/2002 | Cramon et al. ............... 705/1 |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 * | 12/2002 | Ludwig et al. ............... 705/35 |
| 2002/0198828 A1 * | 12/2002 | Ludwig et al. ............... 705/40 |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 * | 7/2003 | Datta et al. ............... 705/1 |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 * | 10/2004 | Northington et al. ............ 705/35 |
| 2004/0210524 A1 * | 10/2004 | Benenati et al. ............... 705/40 |
| 2004/0236639 A1 | 11/2004 | Candadai et al. |
| 2004/0236687 A1 | 11/2004 | Tyson-Quah |
| 2004/0243489 A1 * | 12/2004 | Mitchell et al. ............... 705/30 |
| 2004/0254866 A1 | 12/2004 | Crumbach et al. |
| 2004/0255152 A1 | 12/2004 | Kanamori et al. |
| 2005/0010501 A1 | 1/2005 | Ward |
| 2005/0033588 A1 * | 2/2005 | Ruiz et al. ............... 705/1 |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 * | 6/2005 | Purewal ............... 709/203 |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 * | 9/2005 | Ballow et al. ............... 705/35 |
| 2005/0216325 A1 | 9/2005 | Ziad et al. |
| 2005/0216507 A1 | 9/2005 | Wright |
| 2005/0222896 A1 * | 10/2005 | Rhyne et al. ............... 705/10 |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 * | 6/2007 | Seubert et al. ............... 705/31 |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0164849 A1 | 7/2007 | Haeberle et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |

| | | | |
|---|---|---|---|
| 2007/0174811 | A1 | 7/2007 | Kaetker et al. |
| 2007/0186209 | A1 | 8/2007 | Kaetker et al. |
| 2007/0197877 | A1 | 8/2007 | Decorte et al. |
| 2007/0198391 | A1 | 8/2007 | Dreyer et al. |
| 2007/0214065 | A1 | 9/2007 | Kahlon et al. |
| 2007/0220046 | A1 | 9/2007 | Moosmann et al. |
| 2007/0220143 | A1 | 9/2007 | Lund et al. |
| 2007/0233539 | A1 | 10/2007 | Suenderhauf et al. |
| 2007/0233541 | A1* | 10/2007 | Schorr et al. .............. 705/8 |
| 2007/0233545 | A1 | 10/2007 | Cala et al. |
| 2007/0233574 | A1 | 10/2007 | Koegler et al. |
| 2007/0233575 | A1 | 10/2007 | Berger et al. |
| 2007/0233581 | A1 | 10/2007 | Peter |
| 2007/0233598 | A1 | 10/2007 | Der Emde et al. |
| 2007/0234282 | A1 | 10/2007 | Prigge et al. |
| 2007/0239508 | A1 | 10/2007 | Fazal et al. |
| 2007/0239569 | A1 | 10/2007 | Lucas et al. |
| 2007/0265860 | A1 | 11/2007 | Herrmann et al. |
| 2007/0265862 | A1 | 11/2007 | Freund et al. |
| 2008/0004929 | A9 | 1/2008 | Raffel et al. |
| 2008/0017722 | A1 | 1/2008 | Snyder et al. |
| 2008/0027831 | A1 | 1/2008 | Gerhardt |
| 2008/0065437 | A1 | 3/2008 | Dybvig |
| 2008/0120129 | A1 | 5/2008 | Seubert et al. |
| 2008/0147507 | A1 | 6/2008 | Langhammer |
| 2008/0162382 | A1 | 7/2008 | Clayton et al. |
| 2008/0208707 | A1 | 8/2008 | Erbey et al. |
| 2008/0215354 | A1 | 9/2008 | Halverson et al. |
| 2008/0263152 | A1 | 10/2008 | Daniels et al. |
| 2008/0300959 | A1 | 12/2008 | Sinha et al. |
| 2009/0037287 | A1 | 2/2009 | Baitalmal et al. |
| 2009/0037492 | A1 | 2/2009 | Baitalmal et al. |
| 2009/0063112 | A1 | 3/2009 | Hader et al. |
| 2009/0171716 | A1 | 7/2009 | Suenderhauf et al. |
| 2009/0171818 | A1 | 7/2009 | Penning et al. |
| 2009/0172699 | A1 | 7/2009 | Jungkind et al. |
| 2009/0189743 | A1 | 7/2009 | Abraham et al. |
| 2009/0192858 | A1 | 7/2009 | Johnson |
| 2010/0070324 | A1 | 3/2010 | Bock et al. |
| 2010/0070331 | A1 | 3/2010 | Koegler et al. |
| 2010/0070336 | A1 | 3/2010 | Koegler et al. |
| 2010/0070391 | A1 | 3/2010 | Storr et al. |
| 2010/0070395 | A1 | 3/2010 | Elkeles et al. |
| 2010/0070555 | A1 | 3/2010 | Duparc et al. |
| 2010/0100464 | A1 | 4/2010 | Ellis et al. |
| 2010/0138269 | A1 | 6/2010 | Cirpus et al. |
| 2011/0252395 | A1 | 10/2011 | Charisius et al. |

OTHER PUBLICATIONS

"Cendant Announces Comprehensive Online Travel Booking Solution to Meet President Bush's eTravel Initiative", Cendant Announces Comprehensive Online Travel Booking Solution to Meet President Bush's eTravel Initiative, PR Newswire, Jul. 9,2002.*

"American Software Announces ASP Pricing Model for it's a-Applications Expense Business Solution", PR Newswire. New York: Mar. 6, 2000. p. 1.*

"Hudson's Bay Company Realizes Fast ROI with the Oracle E-Business Suite", PR Newswire. New York: Jan. 15, 2002. p. 1.*

"Cendant Announces Comprehensive Online Travel Booking Solution to Meet President Bush's eTravel Initiative", PR Newswire, Jul. 9, 2002, pp. 1-3.*

"Oracle Expands E-Commerce Offerings with the Acquisition of E-Travel, Inc." PR Newswire. New York: Mar. 9, 1999. p. 1.*

"American Software Announces ASP Pricing Model for it's a-Applications Expense Business Solution", PR Newswire. New York: Mar. 6, 2000. pg. 1.*

"Hudson's Bay Company Realizes Fast ROI with the Oracle E-Business Suite", PR Newswire. New York: Jan 15, 2002. p. 1.*

Wolfe, S, "Real Time visibility (accounting software packages)", Accounting Technology, Aug. 2005, vol. 21, No. 7, p. 1.*

"Brunswick New Technologies Chooses Tenrox to automate Time, expense and Billing", PR Newswire. New York: Jun. 29, 2004, pp. 1-2.*

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docs/VCAB_datasheet.pdf.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.

International Search Report and Written Opinion of the International Searching Authority issued in International Application No. PCT/EP2006/012623; May 7, 2007; 8 pages.

International Preliminary Report on Patentability issued in International Application No. PCT/EP2006/012623; Jul. 1, 2008; 7 pages.

International Search Report and Written Opinion of the International Searching Authority issued in International Application No. PCT/EP2006/012620; Mar. 21, 2007; 7 pages.

International Preliminary Report on Patentability issued in International Application No. PCT/EP2006/012620; Jul. 1, 2008; 6 pages.

International Search Report and Written Opinion of the International Searching Authority issued in International Application No. PCT/EP2006/012619; Apr. 19, 2007; 8 pages.

International Preliminary Report on Patentability issued in International Application No. PCT/EP2006/012619; Jul. 1, 2008; 7 pages.

International Search Report and Written Opinion of the International Searching Authority issued in International Application No. PCT/EP2006/012621; Apr. 19, 2007; 8 pages.

International Preliminary Report on Patentability issued in International Application No. PCT/EP2006/012621; Jul. 1, 2008; 7 pages.

International Search Report and Written Opinion of the International Searching Authority issued in International Application No. PCT/EP2007/002835; Aug. 9, 2007; 12 pages.

International Preliminary Report on Patentability issued in International Application No. PCT/EP2007/002835; Sep. 30, 2008; 8 pages.

Communication Pursuant to Article 94(3) EPC issued in European Application No. 06841224.6; May 15, 2009; 8 pages.

Communication Pursuant to Article 94(3) EPC issued in European Application No. 06847009.5; May 15, 2009; 10 pages.

Communication Pursuant to Article 94(3) EPC issued in European Application No. 07007130.3; Dec. 5, 2008; 6 pages.

Extended European Search Report issued in European Application No. 07007130.3; Oct. 5, 2007; 6 pages.

Office Action issued in U.S. Appl. No. 11/323,041; Apr. 30, 2009; 25 pages.

Office Action issued in U.S. Appl. No. 11/322,612; May 11, 2009; 23 pages.

Office Action issued in U.S. Appl. No. 11/322,772; Mar. 25, 2009; 12 pages.

Office Action issued in U.S. Appl. No. 11/323,590; Jan. 9, 2009; 23 pages.

"Time Management with mySAP$^{TM}$ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.

Notice of Allowance issued in U.S. Appl. No. 11/396,258 on Mar. 31, 2010; 9 pages.

Office Action issued in U.S. Appl. No. 11/322,482; Jan. 7, 2010; 19 pages.

Intuit Canada Ltd.; "Startup Guide—QuickBooks Basic for Windows, QuickBooks Pro for Windows, QuickBooks Premier for Windows"; 2002; 230 pages.

Lockamy III, et al.; "Linking SCOR Planning Practices to Supply Chain Performance"; International Journal of Operationgs & Production Management; vol. 24, No. 12; pp. 1192-1218.

Cascallar, Eduardo et al.; "Assessment in the Evaluation of Self-Regulation as a Process"; Educational Psychology Review; vol. 18, No. 3; Sep. 2006; pp. 297-306.

Cool, David W.; "Activity Fund Accounting"; School Business Affairs; vol. 49, No. 6; Jun. 1983; pp. 50-52.

SAP AG; "SAP NetWeaver Visual Composer: User Guide (SAP NetWeaver Visual Composer release 6.0)"; Document version 1.1; pp. 1-208. Date Unknown.

Strelich, Thomas P. et al.; "Simulation-Based Transformation with the Service Integration/Interoperation Infrastructure"; Technology Review Journal; Fall/Winter 2005; pp. 99-115.

Office Action issued in U.S. Appl. No. 11/396,312 on Sep. 10, 2010; 23 pages.

Office Action issued in U.S. Appl. No. 11/322,611 on Sep. 16, 2010; 21 pages.

Notice of Allowance issued in U.S. Appl. No. 11/322,610 on Sep. 23, 2010; 6 pages.

Notice of Allowance issued in U.S. Appl. No. 11/322,398 on Oct. 29, 2010; 18 pages.

Notice of Allowanced issued in U.S. Appl. No. 11/322,398 on Nov. 15, 2010; 20 pages.

Notice of Allowance issued in U.S. Appl. No. 1/322,382 on Sep. 20, 2010; 6 pages.

Notice of Allowance issued in U.S. Appl. No. 11/396,259 on Oct. 15, 2010; 6 pages.

Office Action issued in U.S. Appl. No. 11/396,250 on Oct. 18, 2010; 15 pages.

Notice of Allowance issued in U.S. Appl. No. 11/396,258 on Nov. 16, 2010; 8 pages.

Office Action issued in U.S. Appl. No. 11/396,236 on Oct. 28, 2010; 19 pages.

Office Action issued in U.S. Appl. No. 11/323,040 on Nov. 5, 2010; 33 pages.

Notice of Allowance issued in U.S. Appl. No. 11/397,026 on Nov. 15, 2010; 7 pages.

Notice of Allowance issued in U.S. Appl. No. 12/233,554 on Sep. 17, 2010; 10 pages.

Notice of Allowance issued in U.S. Appl. No. 11/968,054 on Sep. 7, 2010; 11 pages.

Office Action issued in U.S. Appl. No. 12/233,557 on Sep. 16, 2010; 16 pages.

Notice of Allowance issued in U.S. Appl. No. 12/233,534 on Oct. 20, 2010; 15 pages.

Notice of Allowance issued in U.S. Appl. No. 12/327,354 on Oct. 18, 2010; 16 pages.

Notice of Allowance issued in U.S. Appl. No. 11/967,865 on Oct. 6, 2010; 6 pages.

Office Action issued in U.S. Appl. No. 11/322,973 on Dec. 7, 2010; 13 pages.

Office Action issued in U.S. Appl. No. 11/404,147 on Nov. 24, 2010; 27 pages.

Office Action issued in U.S. Appl. No. 11/967,483; Aug. 20, 2010; 10 pages.

Notice of Allowance issued in U.S. Appl. No. 12/333,085; Sep. 13, 2010; 8 pages.

Bin et al.; "Component Model Optimization for Distributed Real-Time Embedded Software"; IEEE International Conference on Systems, Man and Cybernetics; Oct. 13, 2004; 6 pages.

Cohen; "Optimizer: IBM's Multi-Echelon Inventory System for Managing Service Logistics Interfaces"; vol. 20, No. 1; 1990; pp. 65-82.

Cohen et al.; "Saturn's Supply-Chain Innovation: High Value in After Sales Service"; Sloan Management Review; vol. 41, No. 4; 2000; pp. 93-101.

Cox et al.; "A Formal Model for Component Based Software"; IEEE; Aug. 7, 2002; 8 pages.

Finin et al.; "KQML as an Agent Communication Language"; retrieved on Jul. 26, 2011; pp. 456-463. <http://portal.acm.org/citation.cfm?id=191322>.

Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1<ype=pdf>.

Kalakota et al.; "Readings in Electronic Commerce"; Addison-Wesley Longman, Inc.; 1995; ISBN: 0-201-88060-1.

Orsburn; "Spares Management Handbook"; McGrawHill; 1991; ISBN: 0-8306-7626-0.

Notice of Allowance issued in U.S. Appl. No. 12/233,554 on Jun. 27, 2011; 7 pages.

Notice of Allowance issued in U.S. Appl. No. 12/233,550 on May 11, 2011; 20 pages.

Office Action issued in U.S. Appl. No. 12/333,146 on Sep. 6, 2011; 21 pages.

Office Action issued in U.S. Appl. No. 11/323,634 on Apr. 29, 2011; 8 pages.

Office Action issued in U.S. Appl. No. 11/322,973 on May 27, 2011; 15 pages.

Office Action issued in U.S. Appl. No. 11/404,147 on Aug. 4, 2011; 26 pages.

Notice of Allowance issued in U.S. Appl. No. 12/233,462 on May 18, 2011; 6 pages.

Notice of Allowance issued in U.S. Appl. No. 12/233,462 on Sep. 2, 2011; 7 pages.

Office Action issued in U.S. Appl. No. 12/233,457 on May 26, 2011; 19 pages.

Office Action issued in U.S. Appl. No. 12/327,232 on May 26, 2011; 20 pages.

Office Action issued in U.S. Appl. No. 12/327,590 on Jun. 23, 2011; 16 pages.

Office Action issued in U.S. Appl. No. 12/233,087 on Aug. 18, 2011; 42 pages.

Notice of Allowance issued in U.S. Appl. No. 12/233,534 on May 16, 2011; 12 pages.

Notice of Allowance issued in U.S. Appl. No. 11/322,382 on Jul. 25, 2011; 5 pages.

Notice of Allowance issued in U.S. Appl. No. 11/322,610 on Mar. 31, 2011; 6 pages.

Notice of Allowanced issued in U.S. Appl. No. 11/322,398 on May 27, 2011; 21 pages.

Notice of Allowance issued in U.S. Appl. No. 11/396,259 on Aug. 5, 2011; 7 pages.

Notice of Allowance issued in U.S. Appl. No. 11/396,250 on Jun. 24, 2011; 5 pages.

Notice of Allowance issued in U.S. Appl. No. 11/396,258 on Jun. 28, 2011; 9 pages.

Notice of Allowance issued in U.S. Appl. No. 11/322,851 on Sep. 2, 2011; 8 pages.

Notice of Allowance issued in U.S. Appli. No. 11/322,845; Apr. 8, 2011; 8 pages.

Office Action issued in U.S. Appl. No. 11/323,040 on Jul. 26, 2011; 34 pages.

Notice of Allowance issued in U.S. Appl. No. 11/397,026 on Jul. 20, 2011; 8 pages.

Office Action issued in U.S. Appl. No. 12/233,417 on Apr. 7, 2011; 32 pages.

Notice of Allowance issued in U.S. Appl. No. 12/233,417 on Sep. 14, 2011; 11 pages.

Notice of Allowance issued in U.S. Appl. No. 11/968,054 on Aug. 2; 5 pages.

Office Action issued in U.S. Appl. No. 12/233,530 on Apr. 29, 2011; 11 pages.

Office Action issued in U.S. Appl. No. 11/967,405 on Apr. 27, 2011; 15 pages.

Office Action issued in U.S. Appl. No. 12/233,489 on May 13, 2011; 15 pages.

Office Action issued in U.S. Appl. No. 11/967,393, on Apr. 15, 2011; 12 pages.

Notice of Allowance issued in U.S. Appl. No. 12/327,354 on Aug. 9, 2011; 13 pages.

Office Action issued in U.S. Appl. No. 11/967,387 on Sep. 8, 2011; 14 pages.

Office Action issued in U.S. Appl. No. 12/233,075 on Aug. 4, 2011; 45 pages.

Notice of Allowance issued in U.S. Appl. No. 11/967,865 on Jun. 24, 2011; 8 pages.

Notice of Allowance issued in U.S. Appl. No. 11/967,890 on Jul. 15, 2011; 7 pages.

Ferscha et al.; "A Light-Weight Component Model for Peer-to-Peer Applications"; IEEE; Mar. 23, 2004.

Flissi et al.; "A Component-based Software Infrastructure for Ubiquitous Computing"; IEEE; Jul. 4, 2005.

Gould; "Integrating the Manufacturing Enterprise"; Automative Design & Production; 119, 1; ABI/INFORM Global; Jan. 2007; 3 pages.

Papazoglou et al; "Service-Oriented Computing Research Road Map"; http://infolab.uvt.nl/pub/papazogloump-2006-96.pdf; Mar. 1, 2006; 29 pages.

SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMW FAQ_50070686_en.pdf.

Notice of Allowance issued in U.S. Appl. No. 11/322,610 on Dec. 22, 2010; 6 pages.

Notice of Allowance issued in U.S. Appl. No. 1/322,382 on Jan. 6, 2011; 7 pages.

Notice of Allowance issued in U.S. Appl. No. 11/396,259 on Jan. 20, 2011; 6 pages.

Notice of Allowance issued in U.S. Appl. No. 11/396,250 on Mar. 2, 2011; 13 pages.

Notice of Allowance issued in U.S. Appl. No. 11/322,845; Dec. 27, 2010; 16 pages.

Notice of Allowance issued in U.S. Appl. No. 11/397,026 on Mar. 3, 2011; 6 pages.

Notice of Allowance issued in U.S. Appl. No. 12/233,554 on Feb. 22, 2011; 7 pages.

Office Action issued in U.S. Appl. No. 12/233,550 on Jan. 12, 2011; 29 pages.

Office Action issued in U.S. Appl. No. 12/233,557 on Mar. 4, 2011; 19 pages.

Notice of Allowance issued in U.S. Appl. No. 12/233,534 on Jan. 31, 2011; 15 pages.

Notice of Allowance issued in U.S. Appl. No. 12/327,354 on Feb. 1, 2011; 16 pages.

Notice of Allowance issued in U.S. Appl. No. 11/396,327 on Nov. 30, 2010; 28 pages.

Notice of Allowance issued in U.S. Appl. No. 12/233,462 on Feb. 2, 2011; 11 pages.

Office Action issued in U.S. Appl. No. 11/967, 483 on Mar. 4, 2011; 6 pages.

Anonymous; "Mastering Management"; Motor Age, vol. 25, No. 10; Oct. 2006; pp. 1-3.

Gerin et al.; "Flexible and Executable Hardware/Software Interface Modeling for Multiprocessor SOC Design Using SystemC"; IEEE; 2007; pp. 390-395.

Hahn; "A Domain Specific Modeling Language for Multi-Agent Systems"; ACM AAMAS; 2008; pp. 233-240.

Hu; "A Co-Design Modeling Approach for Computer Network Systems"; IEEE; 2007; pp. 685-693.

Kremic, Tibor; "Outsourcing Decision Support: A Survey of Benefits, Risks, and Decision Factor"; Supply Chain Management; V. 11; 2006; pp. 467-482.

Sarjoughian et al.; "CoSMOs: A Visual Environment for Component Based Modeling, Experimental Design and Simulation"; ACM; 2009; pp. 1-9.

Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.

Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.

Notice of Allowance issued in U.S. Appl. No. 12/233,550 on Jan. 9, 2012; 11 pages.

Notice of Allowance issued in U.S. Appl. No. 11/396,327 on Sep. 28, 2011; 31 pages.

Office Action issued in U.S. Appl. No. 12/233,479 on Oct. 27, 2011; 24 pages.

Office Action issued in U.S. Appl. No. 12/332,965 on Oct. 11, 2011; 6 pages.

Notice of Allowance in U.S. Appl. No. 12/233,462 on Dec. 12, 2011; 6 pages.

Office Action issued in U.S. Appl. No. 12/233,289 on Oct. 27, 2011; 15 pages.

Notice of Allowance issued in U.S. Appl. No. 12/233,457 on Nov. 3, 2011; 12 pages.

Notice of Allowance issued in U.S. Appl. No. 12/327,232 on Nov. 2, 2011; 16 pages.

Notice of Allowance issued in U.S. Appl. No. 12/327,590 on Dec. 28, 2011; 10 pages.

Office Action issued in U.S. Appl. No. 12/327,701 on Nov. 8, 2011; 20 pages.

Notice of Allowance issued in U.S. Appl. No. 12/233,534 on Dec. 28, 2011; 7 pages.

Notice of Allowanced issued in U.S. Appl. No. 11/322,398 on Oct. 18, 2011; 7 pages.

Office Action issued in U.S. Appl. No. 11/322,383 on May 12, 2010; 23 pages.

Office Action issued in U.S. Appl. No. 11/322,383 on Nov. 12, 2009; 23 pages.

Notice of Allowance issued in U.S. Appl. No. 11/396,250 on Dec. 7, 2011; 6 pages.

Examiner's Answer to Appeal Brief issued in U.S. Appl. No. 11/396,236 on Nov. 10, 2011; 19 pages.

Office Action issued in U.S. Appl. No. 11/396,252 on Nov. 10, 2011; 18 pages.

Notice of Allowance issued in U.S. Appl. No. 11/322,845; Nov. 13, 2011; 9 pages.

Office Action issued in U.S. Appl. No. 11/397,026; Jul. 21, 2009; 28 pages.

Notice of Allowance issued in U.S. Appl. No. 11/397,026 on Nov. 4, 2011; 8 pages.

Notice of Allowance issued in U.S. Appl. No. 12/233,520 on Nov. 10, 2011; 22 pages.

Notice of Allowance issued in U.S. Appl. No. 11/968,054 on Aug. 2, 2011; 5 pages.

Office Action issued in U.S. Appl. No. 11/967,489 on Sep. 28, 2011; 7 pages.

Office Action issued in U.S. Appl. No. 12/233,458 on Oct. 12, 2011; 19 pages.

Notice of Allowance issued in U.S. Appl. No. 11/967,393 on Nov. 9, 2011; 9 pages.

Anon.; "Sequent Corp Bell Atlantic: Bell Atlantic Selects Sequent for Video-on-Demand Program; Sequent Moves to Sieze Opportunity in New Market"; Business Wire; Dec. 6, 1994.

Anon.; "State of the Art Reports 13,000 MAS 90 for WINDOWS Shipments in First Nine Months of Availability"; PR Newswire; Apr. 28, 1997.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.

Avery, S.; "Buyers' Guide to Software for Purchasing 2000.(Directory)"; Purchasing, vol. 129, No. 1; p. 179; Jul. 13, 2000.

Bastani et al.; "Complex Open System Design by Quasi Agents: Process Oriented Modeling in Agent Based Systems"; ACM SIGSOFT; vol. 34, No. 4; 2009; pp. 1-14.

Bastani et al.; "Process Oriented Abstraction of the Complex Evolvable Systems: Problem Model Construction"; ACM SIGSOFT; vol. 33, No. 3; 2008; pp. 1-13.

Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.

Duc et al.; "Uniform Object Modeling Methodology and Reuse of Real Time System Using UML"; EMSOFT '05; Sep. 19-22, 2005; pp. 44-47.

Gomaa et al.; "Model Based Software Design and Adaption"; International Workshop on Software Engineering for Adaptive and Self-Managing Systems (SEAMS '07); IEEE; 2007; 10 pages.

Huang, S. et al.; "Computer-Assisted Supply Chain Configuration Based on Supply Chain Operations Reference (SCOR) Model"; Computers & Industrial Engineering 48; 2005; pp. 377-394.

Intuit Canada Ltd.; " Startup Guide—QuickBooks Basic for Windows, QuickBooks Pro for Windows, QuickBooks Premier for Windows"; 2002; 230 pages.

Lambert et al.; "Supply Chain Metrics"; International Journal of Logistics Management; vol. 12, No. 1; 2001; pp. 1-19.

Lockamy III, et al.; "Linking SCOR Planning Practices to Supply Chain Performance"; International Journal of Operationgs & Production Management; vol. 24, No. 12; pp. 1192-1218, 2004.

MySAP$^{TM}$ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.

Ouyang et al.; "From Business Process Models to Process Oriented Software Systems"; ACM Transactions on Software Engineering and Methodology; vol. 19, No. 1, Article 2; Aug. 2009; pp. 1-37.

Rossi et al.; "Designing and Architecturing Process-aware Web Applications with EPML"; SAC '08; Mar. 16-20, 2008; pp. 2409-2414.

"SAP Delivers Next-generation ERP to Customers"; PR Newswire; New York; Mar. 10, 2005; 7 pages.

Schultz, G.J.; "Keeping SCOR on Your Supply Chain: Basic Operations Reference Model Updates with the Times"; Information Strategy: The Executive's Journal; Summer 2003; pp. 12-20.

Stephens, S.; "Supply Chain Council & Supply Chain Operations Reference (SCOR) Model Overview"; <http://www.supply-chain.org>; Version 5.0a; Aug. 2001; 29 pages.

Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.

"Time Management with mySAP$^{TM}$ ERP Human Capital Management"; Downloaded Mar. 24, 2010 from <http://web.archive.org/web/20060105084834/www.sap.com/solutions/business-suite/erp/hem/pdf/HCM_Time_Management.pdf>; 4 pages.

Vogel et al.; "mySAP ERP for Dummies"; Published on Sep. 30, 2005; Downloaded on Mar. 23, 2001 from <http://proquest.safaribooksonline.com/9780764599958> 41 pages.

International Search Report and Written Opinion of the International Searching Authority issued in International Application No. PCT/EP2007/002841; Aug. 16, 2007; 12 pages.

International Preliminary Report on Patentability under Chapter I issued in International Application No. PCT/EP2007/002841; Sep. 30, 2008; 8 pages.

Office Action issued in U.S. Appl. No. 11/396,312 on Mar. 30, 2010; 23 pages.

Office Action issued in U.S. Appl. No. 11/322,611 on Mar. 31, 2010; 17 pages.

Notice of Allowance issued in U.S. Appl. No. 11/322,610 on Mar. 1, 2010; 12 pages.

Notice of Allowance issued in U.S. Appl. No. 11/322,610 on Jun. 14, 2010; 6 pages.

Office Action issued in U.S. Appl. No. 11/322,772; Dec. 9, 2009; 14 pages.

Office Action issued in U.S. Appl. No. 11/322,772; Jul. 12, 2010; 18 pages.

Office Action issued in U.S. Appl. No. 11/322,398 on Apr. 2, 2010; 39 pages.
Notice of Allowance issued in U.S. Appl. No. 11/322,398 on Jul. 23, 2010; 38 pages.
Office Action issued in U.S. Appl. No. 11/322,383; Nov. 12, 2009; 29 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,259 on Jul. 6, 2010; 6 pages.
Office Action issued in U.S. Appl. No. 11/396,258; Nov. 25, 2009; 9 pages.
Notice of Allowance issued in U.S. Appl No. 11/396,258 on Mar. 31, 2010; 9 pages.
Supplemental Notice of Allowance issued in U.S. Appl. No. 11/396,258 on May 19, 2010; 8 pages.
Notice of Allowance issued in U.S. Appl. No. 11/396,258 on Jul. 28, 2010; 9 pages.
Office Action issued in U.S. Appl. No. 11/396,236 on Mar. 31, 2010; 20 pages.
Office Action issued in U.S. Appl. No. 11/323,039; Sep. 4, 2009; 36 pages.
Office Action issued in U.S. Appl. No. 11/323,039; Apr. 14, 2010; 15 pages.
Office Action issued in U.S. Appl. No. 11/322,851; Sep. 2, 2009; 32 pages.
Office Action issued in U.S. Appl. No. 11/322,851; May 12, 2010; 15 pages.
Office Action issued in U.S. Appl. No. 11/322,845; Jul. 15, 2010; 16 pages.
Office Action issued in U.S. Appl. No. 11/323,040; Jul. 24, 2009; 35 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Office Action issued in U.S. Appl No. 11/397,026; Jul. 21, 2009; 28 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Office Action issued in U.S. Appl No. 11/322,482; Jan. 7, 2010; 19 pages.
Notice of Allowance issued in U.S. Appl. No. 11/322,482; Jul. 13, 2010; 5 pages.
Office Action issued in U.S. Appl. No. 11/323,590; Jul. 10, 2009; 32 pages.
Office Action issued in U.S. Appl. No. 11/323,590; Dec. 30, 2009; 31 pages.
Office Action issued in U.S. Appl. No. 11/323,590; Jun. 21, 2010; 25 pages.
Office Action issued in U.S. Appl. No. 11/323,634; Sep. 10, 2009; 15 pages.
Office Action issued in U.S. Appl. No. 11/323,634; Apr. 2, 2010; 9 pages.
Office Action issued in U.S. Appl. No. 11/322,816; Jul. 23, 2009; 41 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Jun. 25, 2009; 9 pages.
Office Action issued in U.S. Appl. No. 12/333,085; Mar. 23, 2010; 5 pages.
"IDe Partners with Journyx to Offer Customers Best-in-Class Time Management Solution"; PR Newswire; Mar. 8, 2005; Business Dateline.
Meseroll, Robert; "Data Mining Navy Flight"; IEEE Autotestcom 2007; Sep. 2007; pp. 476-481.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Office Action issued in U.S. Appl. No. 12/233,479 on May 7, 2012; 26 pages.
Notice of Allowance issued in U.S. Appl. No. 12/332,965 on Jun. 11, 2012; 21 pages.
Notice of Allowance in U.S. Appl. No. 12/233,462 on Apr. 5, 2012; 7 pages.
Notice of Allowance issued in U.S. Appl. No. 12/233,289 on Feb. 15, 2012; 11 pages.
Notice of Allowance issued in U.S. Appl. No. 12/327,701 on Apr. 6, 2012; 9 pages.
Notice of Allowance issued in U.S. Appl. No. 12/233,087 on Mar. 30, 2012; 30 pages.
Notice of Allowance issued in U.S. Appl. No. 11/396,259 on Mar. 15, 2012; 7 pages.
Notice of Allowance issued in U.S. Appl. No. 11/396,258 on Feb. 3, 2012; 12 pages.
Notice of Allowance issued in U.S. Appl No. 11/322,851 on Mar. 1, 2012; 9 pages.
Notice of Allowance issued in U.S. Appl. No. 11/397,026 on Feb. 23, 2012; 8 pages.
Office Action issued in U.S. Appl. No. 11/967,489 on Feb. 6, 2012; 9 pages.
Office Action issued in U.S. Appl. No. 11/967,387 on Apr. 12, 2012; 13 pages.
Office Action issued in U.S. Appl.No. 12/327,737 on Mar. 26, 2012; 14 pages.
Notice of Allowance issued in U.S. Appl. No. 12/233,075 on Mar. 22, 2012; 25 pages.

* cited by examiner

PROVIDING PAYMENT SOFTWARE APPLICATION AS ENTERPRISE SERVICES

BACKGROUND

This specification relates to data processing systems implemented on computers, and more particular to data processing systems providing services in the nature of web services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

Web services are one technology for making the functionality of software applications available to other software, including other applications. A web service is a standard-based way of encapsulating the functionality of an application that other applications can locate and access. A service-oriented architecture is a distributed software model within which all functionality is defined as independent web services. Within a service-oriented architecture, web services can be used in defined sequences according to the business logic to form applications that enable business processes.

SUMMARY

This specification describes a services architecture design that provides enterprise services having payment functionality at the level of an enterprise application. Enterprise services are web services that have an enterprise-level business value.

In its various aspects, the invention can be embodied in systems, methods, and computer program products. For example, a system in one embodiment implements a services architecture design that provides enterprise services having payment functionality at the level of an enterprise application. The design includes a set of service operations, process components, and optionally deployment units. Suitable business objects are also described.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
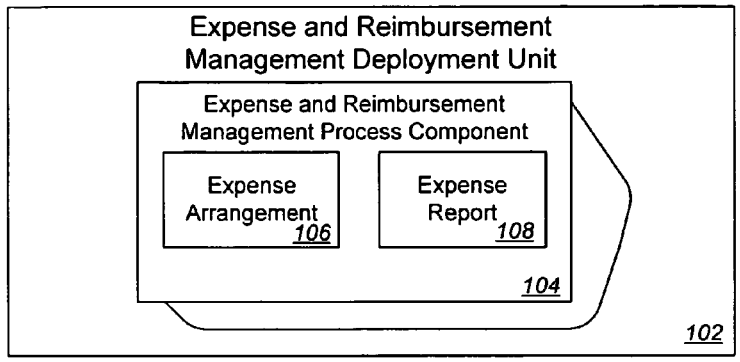
FIGS. 1A, 1B, 1C and 1D collectively illustrate a high-level view of a software architectural design and implementation of a suite enterprise software services having payment functionality.
Figure 1B:
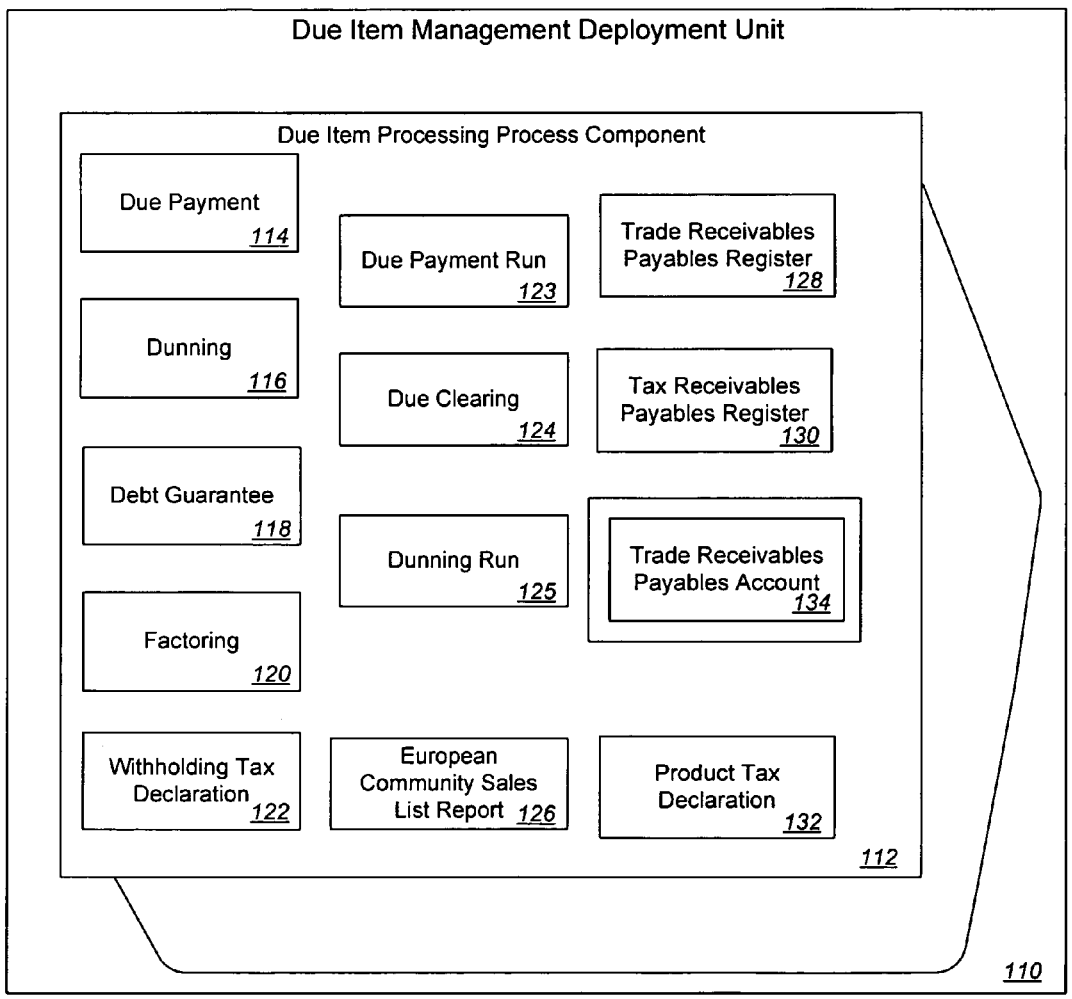
Figure 1C:
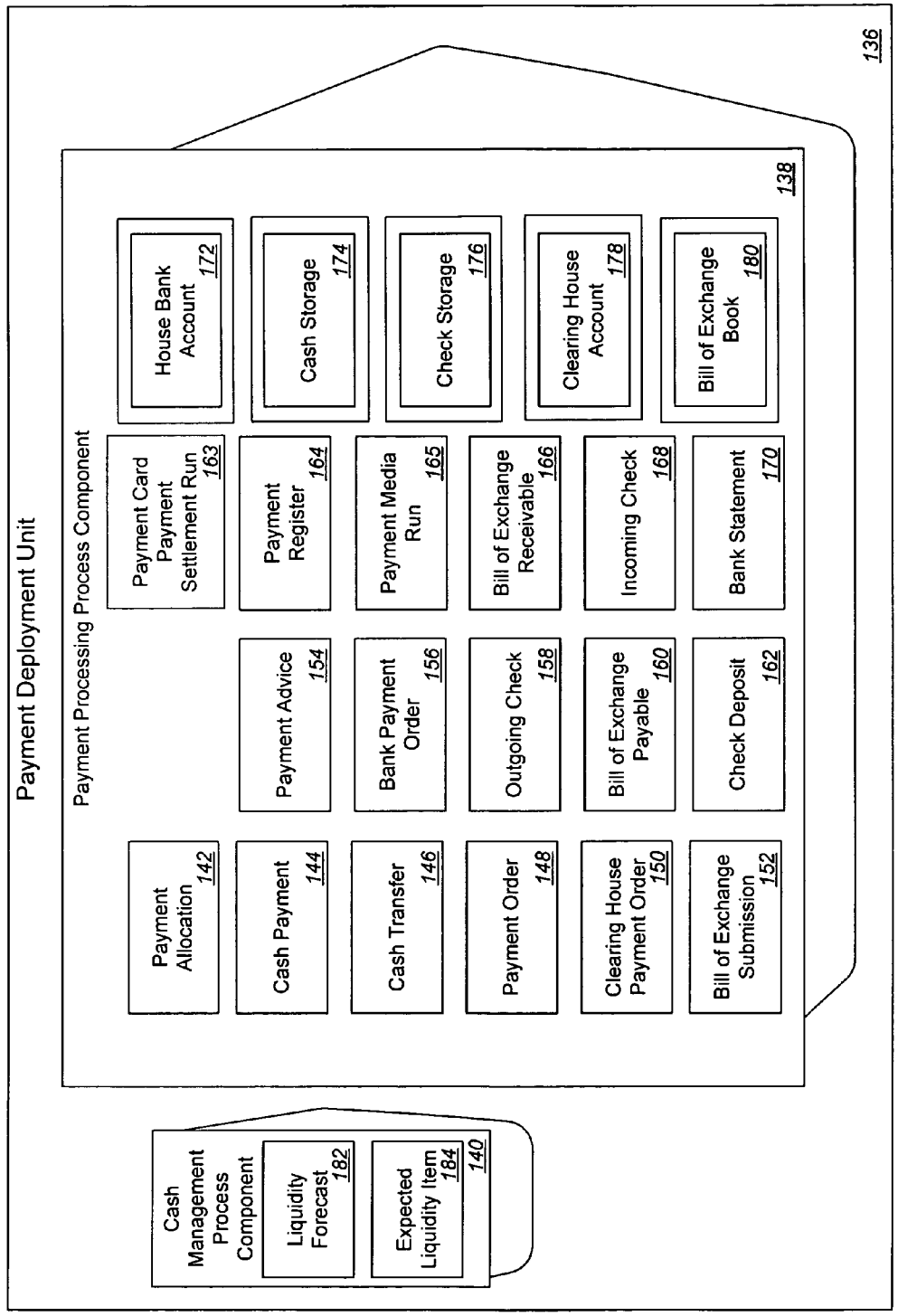
Figure 1D:
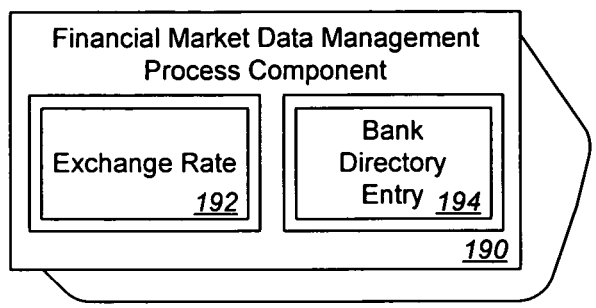

FIGS. 1A, 1B, 1C and 1D collectively illustrate a high-level view of a software architectural design and of an application software implementation that provides a suite of enterprise service operations, which can be organized into interfaces, having payment application functionality. The software corresponding to FIGS. 1A, 1B and 1C in one implementation is for deployment in an application layer of an application server, while the software corresponding to FIG. 1D is for deployment in a foundation layer, which will be described below.

The elements of the architecture include the business object, the process component, the service operation (or simply, the operation), the service interface, the message, and the deployment unit. The elements can also include process agents and reuse service components. These will be generally described below.

In one implementation, the software is implemented to be deployed on an application platform that includes a foundation layer that contains all fundamental entities that can used from multiple deployment units. These entities can be process components, business objects or reuse service components. A reuse service component is a piece of software that is reused in different transactions. A reuse service component is used by its defined interfaces, which can be, e.g., local APIs (Application Programming Interfaces) or service interfaces.

The architectural design is a specification of a computer software application, and elements of the architectural design can be implemented to realize a software application that implements enterprise application service interfaces. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, and instances of business objects include content, which a typical business user would expect and understand with little explanation. Whether an object as a type or an instance of an object is intended by the term is generally clear from the context, so the distinction will be made explicitly only when necessary. Properly implemented, business objects are implemented free of redundancies.

Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). A mass data run object is an application object that executes an algorithm for a particular mass data run. An instance of a mass data run object contains a particular set of selections and parameters. A mass data run object implements an algorithm that modifies, manages, and/or processes a large amount of data in multiple transactions, possibly but not necessarily with parallel processing. A dependent object is a business object used as a reuse part in another business object. A dependent object represents a concept that cannot stand by itself from a business point of view. Instances of dependent objects only occur in the context of a non-dependent business object. A transformed object is a transformation of multiple business objects for a well-defined purpose. It transforms the structure of multiple business objects into a common structure. A transformed object does not have its own persistency.

The architectural elements also include the process component. A process component is a software package that realizes a business process and generally exposes its functionality as services. The functionality contains business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them serving as a signature. For convenience in supporting use of the operations supported by a system implementing elements of the design, such a system can optionally include a repository of service descriptions that includes a standards-based description of each of the supported service operations.

The architectural elements also include the service interface, which may be referred to simply as an interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are preferably assigned to their respective deployment unit.

FIGS. 1A, 1B, 1C and 1D collectively illustrate a high-level view of a software architectural design and implementation of a suite enterprise software services having payment functionality.

As shown in FIG. 1A, an Expense and Reimbursement Management deployment unit 102 includes: an Expense and Reimbursement Management process component 104, an Expense Arrangement business object 106, and an Expense Report business object 108.

Additionally, a Due Item Management deployment unit 110 includes: a Due Item Processing process component 112, a Due Payment business object 114, a Dunning business object 116, a Debt Guarantee business object 118, a Factoring business object 120, a Withholding Tax Declaration business object 122, a Due Payment Run business object 123, a Due Clearing business object 124, a Dunning Run business object 125, a European Community Sales List Report business object 126, a Trade Receivables Payables Register business object 128, a Tax Receivables Payables Register business object 130, a Product Tax Declaration business object 132, and a Trade Receivables Payables Account master data object 134.

As shown in FIG. 1C, the implementation a Payment deployment unit 136 includes a Payment Processing process component 138 and a Cash Management process component 140.

The Payment Processing process component 138 includes fifteen business objects: a Payment Allocation business object 142, a Cash Payment business object 144, a Cash Transfer business object 146, a Payment Order business object 148, a Clearing House Payment Order business object 150, a Bill of Exchange Submission business object 152, a Payment Advice business object 154, a Bank Payment Order business object 156, an Outgoing Check business object 158, a Bill of Exchange Payable business object 160, a Check Deposit business object 162, a Payment Card Payment Settlement Run business object 163, a Payment Register business object 164, a Payment Media Run business object 165, a Bill of Exchange Receivable business object 166, an Incoming Check business object 168, and a Bank Statement business object 170.

The Payment Processing process component 138 also includes five master data objects: a House Bank Account master data object 172, a Cash Storage master data object 174, a Check Storage master data object 176, a Clearing House Account master data object 178, and a Bill of Exchange Book master data object 180.

The Cash Management process component 140 includes a Liquidity Forecast business object 182 and an Expected Liquidity Item business object 184.

As shown in FIG. 1D, a Financial Market Data Management process component 190 in the foundation layer may also be used. The Financial Market Data Management process component 190 includes an Exchange Rate master data object 192 and a Bank Directory Entry master data object 194.

The Exchange Rate master data object 192 is the relative value of two different currencies for a particular time span. The Exchange Rate master data object 192 may be used to convert from one currency to another. Exchange rates can be specified by exchange rate. The Bank Directory Entry master data object 194 represents a bank master data.

The Financial Market Data Management process component 190 integrates all data and activities concerning Financial Market Data, provided by generally accepted agencies. Financial Market data may include bank directory entries and exchange rates. The process component 190 allows maintenance of the data manually or retrieval of the data from a generally accepted agency.

Figure 2A:
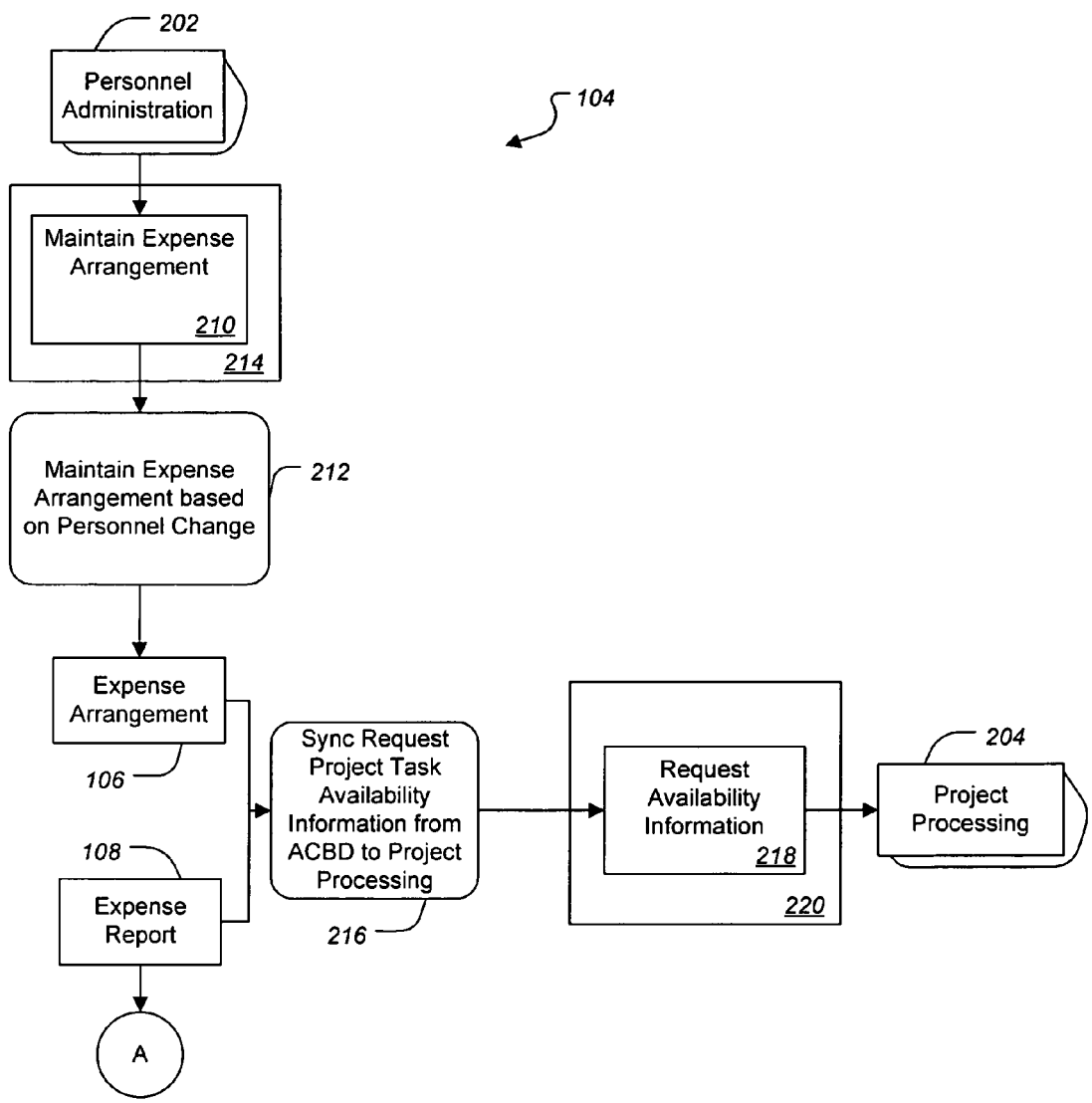
FIGS. 2A and 2B are block diagrams collectively showing an expense and reimbursement management process component.
Figure 2B:
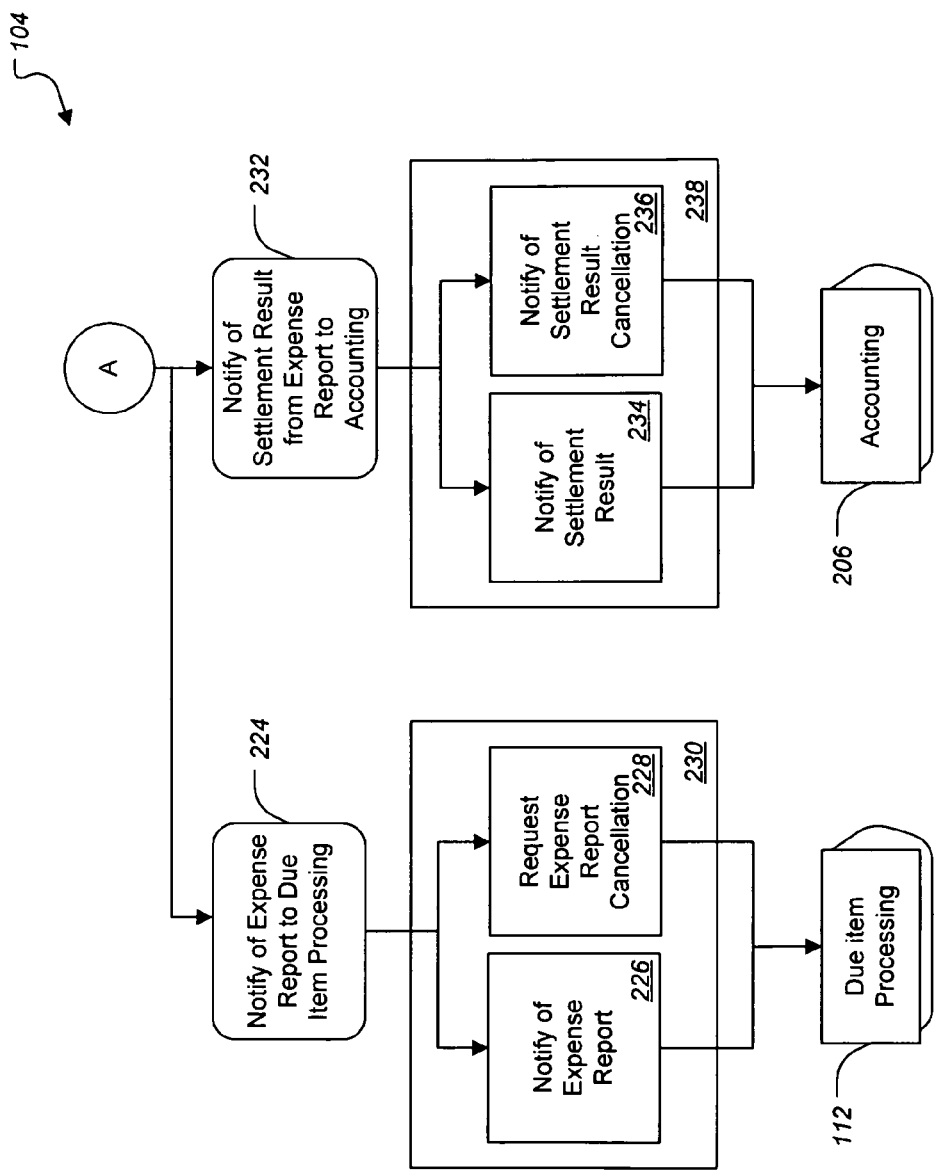

FIGS. 2A and 2B are block diagrams collectively showing the Expense and Reimbursement Management process component 104 (FIG. 1A). For convenience in describing this process component, a number of other process components are shown in the figures; these other process components are not part of the process component being described. These other process components are a Personnel Administration process component 202, a Project Processing process component 204, the Due Item Processing process component 112, and an Accounting process component 206. These other process components are used to represent software external to the process component in describing its interactions with the external software; however, while the external software can be implemented as such process components, this is not required.

A Maintain Expense Arrangement operation 210 can send an expense arrangement notification using a Maintain Expense Arrangement based on Personnel Change asynchronous inbound process agent 212 to update the Expense Arrangement business object 106. For example, the operation 210 can send an expense arrangement to update the Expense Arrangement business object 106 if input is received from the Personnel Administration process component 202. The Maintain Expense Arrangement operation 210 is included in a Personnel Administration In interface 214.

The Expense Arrangement business object 106 and the Expense Report business object 108 can receive updated information and send the update into other components to perform further operations. As shown in FIGS. 2A and 2B, multiple outbound process agents can receive information from the Expense Arrangement business object 106 and the Expense Report business object 108.

A Synchronous Request Project Task Availability Information from ACBD to Project Processing synchronous outbound process agent 216 can invoke a Request Project Task Availability Information operation 218. For example, the outbound process agent 216 can send a notification of an expense that applies to an existing project. The notification can be sent to the Project Processing process component 204. The Request Project Task Availability Information operation 218 is included in a Project Task Availability Out interface 220.

A Notify of Settlement Result from Expense Report to Due Item Processing asynchronous outbound process agent 224 can invoke a Notify of Settlement Result operation 226. For example, the outbound process agent 224 can send a notification of a settlement based on an expense report for updating due item processing. The notification can be sent to the Due Item Processing process component 112. Similarly, the outbound process agent 224 can invoke a Notify of Settlement Result Cancellation operation 228. For example, the outbound process agent 224 can send a notification to cancel a settlement based on an expense report previously sent to due item processing. The notification can be sent to the Due Item Processing process component 112. The Notify of Settlement Result operation 226 and the Notify of Settlement Result Cancellation operation 228 are included in a Receivables Payables Out interface 230.

A Notify of Settlement Result from Expense Report to Accounting asynchronous outbound process agent 232 can invoke a Notify of Settlement Result operation 234. For example, the outbound process agent 232 can send a notification of a settlement result for accounting. The notification can be sent to the Accounting process component 206. Similarly, the outbound process agent 232 can invoke a Notify of Settlement Result Cancellation operation 236. For example, the outbound process agent 232 can send a notification to cancel a settlement result in accounting. The notification can be sent to the Accounting process component 206. The Notify of Settlement Result operation 234 and the Notify of Settlement Result Cancellation operation 236 are included in an Expense Accounting Out interface 238.

FIG. 3A is a block diagram showing the Cash Management process component 140 (FIG. 1C). For convenience in describing this process component, another process component is shown in the figure; this other process component is not part of the process component being described. This other process component is the Due Item Processing process component 112. This other process component is used to represent software external to the process component in describing its interactions with the external software; however, while the external software can be implemented as such process components, this is not required.

Figure 3:
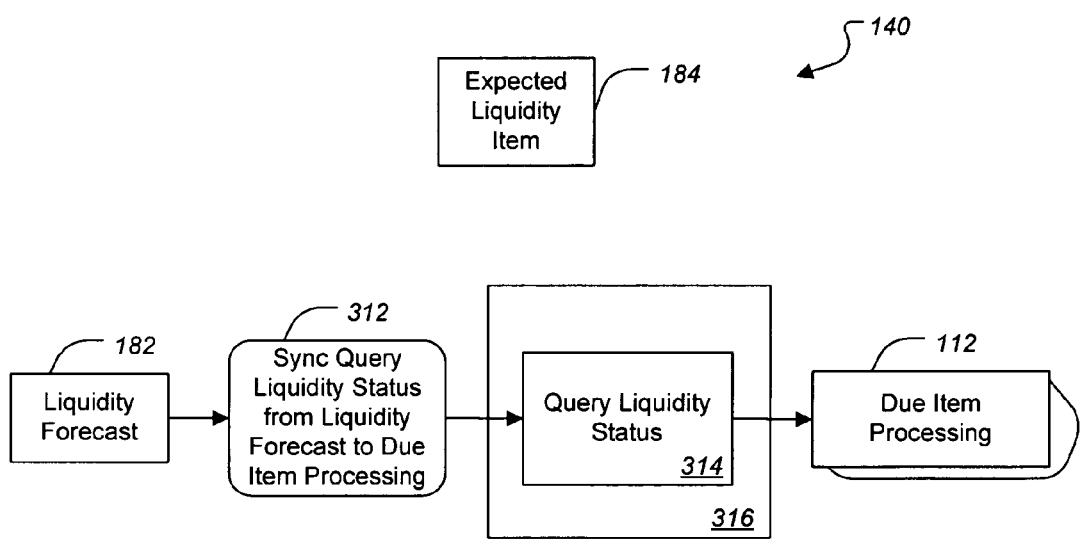
FIG. 3 is a block diagram showing a cash management process component.

The Liquidity Forecast business object 182 can receive updated information and send the update into other components to perform further operations. As shown in FIG. 3, outbound process agents can receive information from the Liquidity Forecast business object 182.

A Synchronous Query Liquidity Status from Liquidity Forecast to Due Item Processing synchronous outbound process agent 312 can invoke a Query Liquidity Status operation 314. For example, the outbound process agent 312 can synchronize liquidity forecast status information to other process components, such as the Due Item Processing process component 112. The Query Liquidity Status operation 314 is included in a Liquidity Status Out interface 316.

FIGS. 4A, 4B, 4C, 4D, 4E and 4F are block diagrams collectively showing the Payment Processing process component 138 (FIG. 1C). For convenience in describing this process component, a number of other process components are shown in the figures; these other process components are not part of the process component being described. These other process components are the Due Item Processing process component 112, a Payment Processing at Business Partner process component 401, a Bank Statement Creation at Bank process component 402, a Lock Box File Creation at Provider process component 403, a Customer Invoice Processing process component 404, the Accounting process component 206, a Settlement Processing at Clearing House process component 407, and a Payment Order Processing at House Bank process component 408. These other process components are used to represent software external to the process component in describing its interactions with the external software; however, while the external software can be implemented as such process components, this is not required.

A Create Payment Reservation operation 411 (FIG. 4A) can send a payment reservation creation request using a Synchronous Maintain Payment Reservation synchronous inbound process agent 412 to update the Payment Order business object 148. For example, the operation 411 can send a payment reservation creation request to update the Payment Order business object 148 if input is received from the Due Item Processing process component 112. Similarly, a Cancel Payment Reservation operation 413 can send a payment reservation cancellation request, also using the Synchronous Maintain Payment Reservation synchronous inbound process agent 412 to update the Payment Order business object 148. For example, the operation 413 can send a payment reservation cancellation request to update the Payment Order business object 148 if input is received from the Due Item Processing process component 112. Similarly, a Synchronous Change Payment Reservation operation 414 can send a payment reservation synchronize change request, also using the Synchronous Maintain Payment Reservation synchronous inbound process agent 412 to update the Payment Order business object 148. For example, the operation 414 can send a payment request synchronize change notification to update the Payment Order business object 148 if input is received from the Due Item Processing process component 112. Similarly, a Change Payment Reservation operation 415 can send a payment reservation change request, also using the Synchronous Maintain Payment Reservation synchronous inbound process agent 412 to update the Payment Order business object 148. For example, the operation 415 can send a payment reservation change request to update the Payment Order business object 148 if input is received from the Due Item Processing process component 112. The Create Payment Reservation operation 411, the Cancel Payment Reservation operation 413, the Synchronous Change Payment Reservation operation 414, and the Change Payment Reservation operation 415 are included in a Payment Request In interface 416.

A Create Payment Order operation 417 can send a payment order creation request using a Maintain Payment Order asynchronous inbound process agent 418 to update the Payment Order business object 148. For example, the operation 417 can send a payment order creation request to update the Payment Order business object 148 if input is received from the Due Item Processing process component 112. A Cancel Payment Order operation 419 can send a payment order cancellation request, also using the Maintain Payment Order asynchronous inbound process agent 418 to update the Payment Order business object 148. For example, the operation 419 can send a payment order cancellation request to update the Payment Order business object 148 if input is received from the Due Item Processing process component 112. The Create Payment Order operation 417 and the Cancel Payment Order operation 419 are included in a Payment Request In interface 420.

Figure 4A:
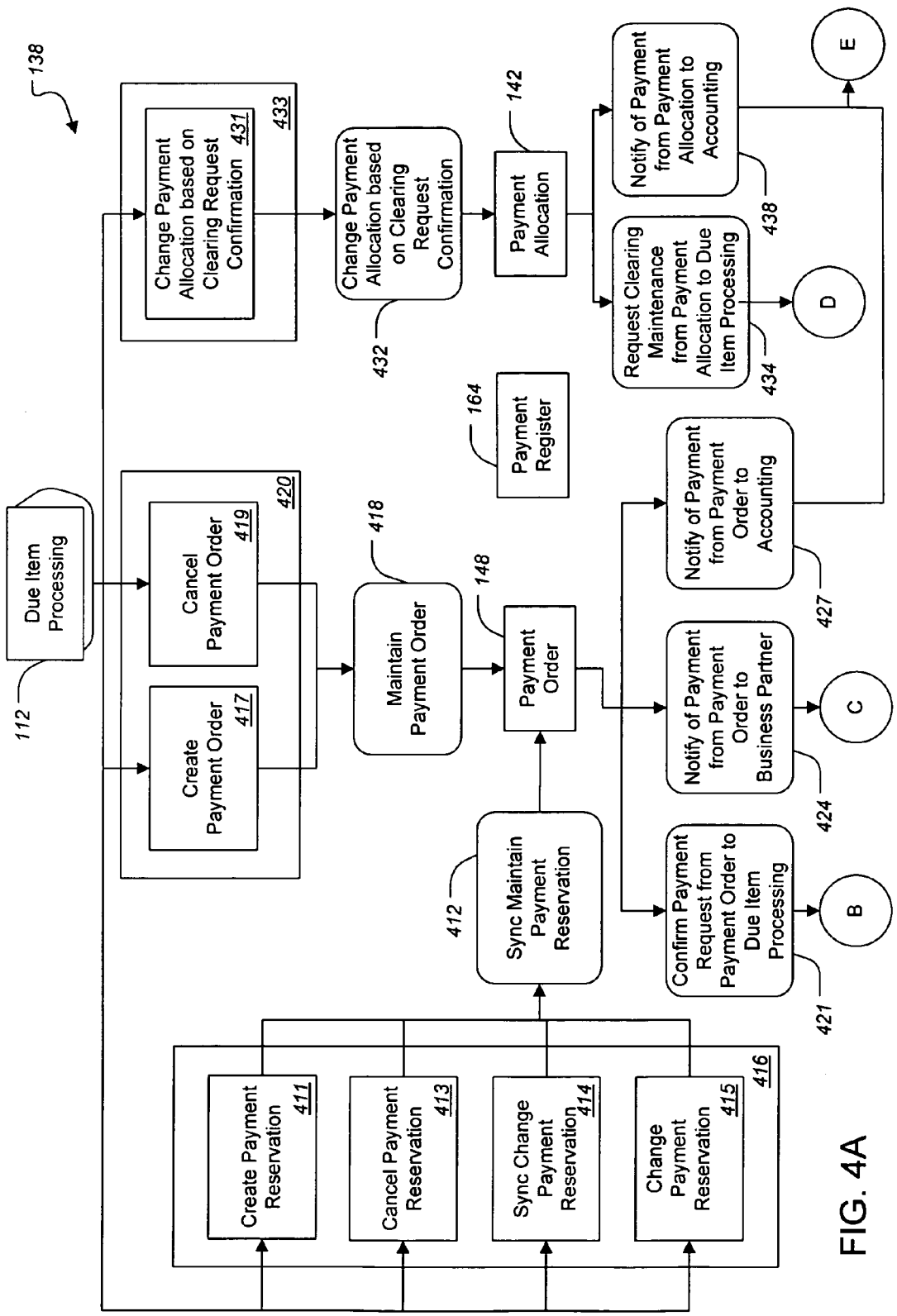
FIGS. 4A, 4B, 4C, 4D, 4E and 4F are block diagrams collectively showing a payment processing process component.
Figure 4B:
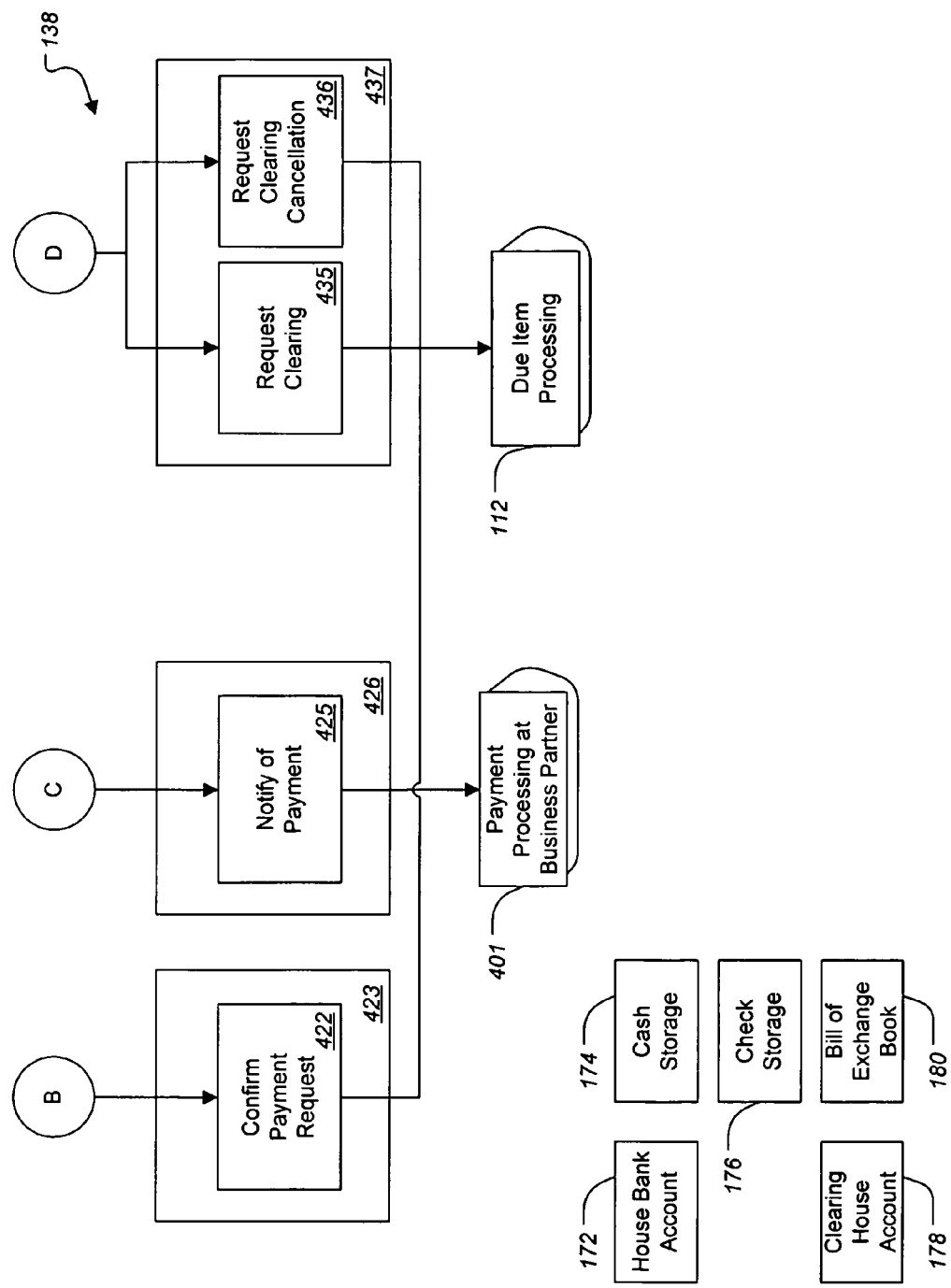
Figure 4C:
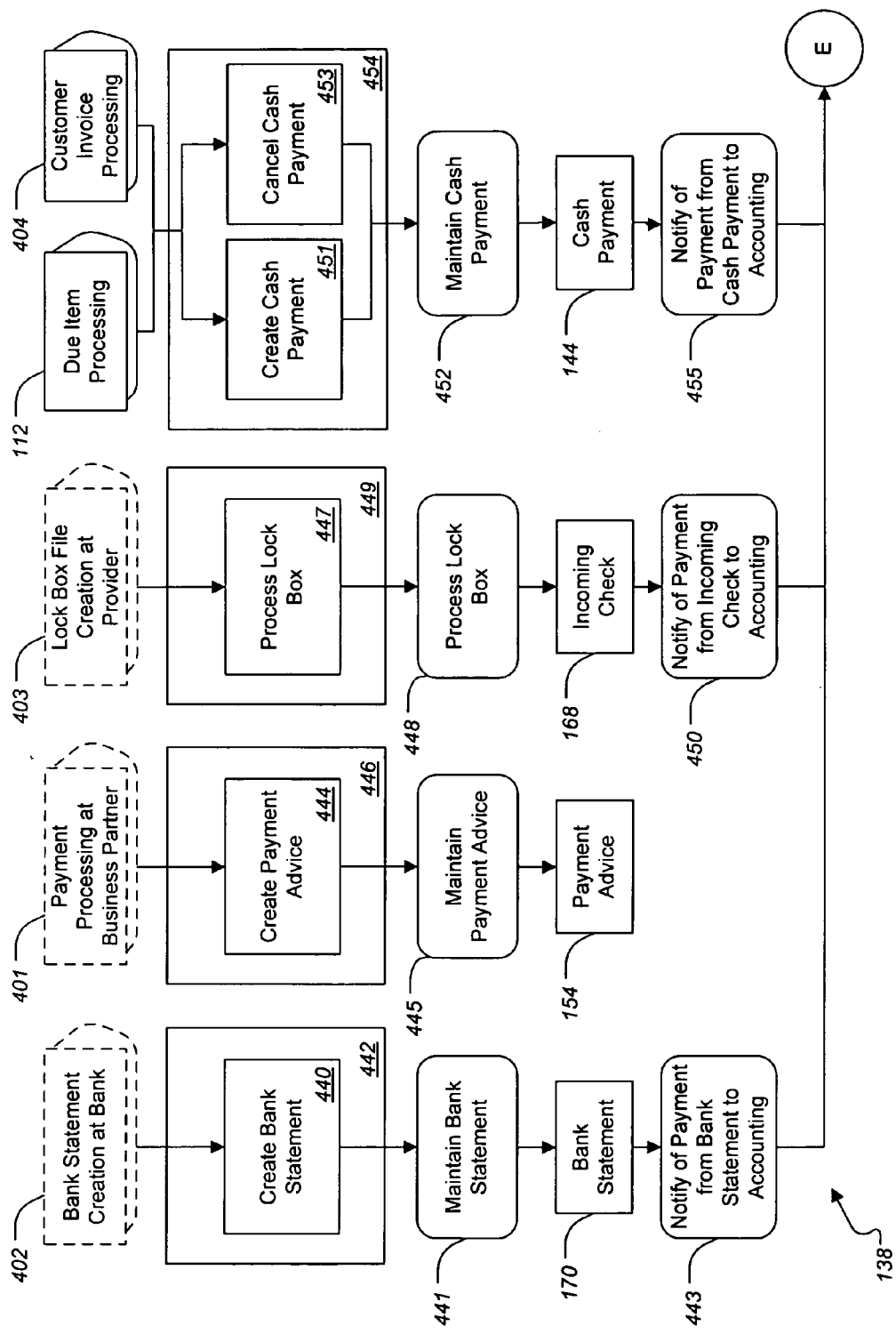
Figure 4D:
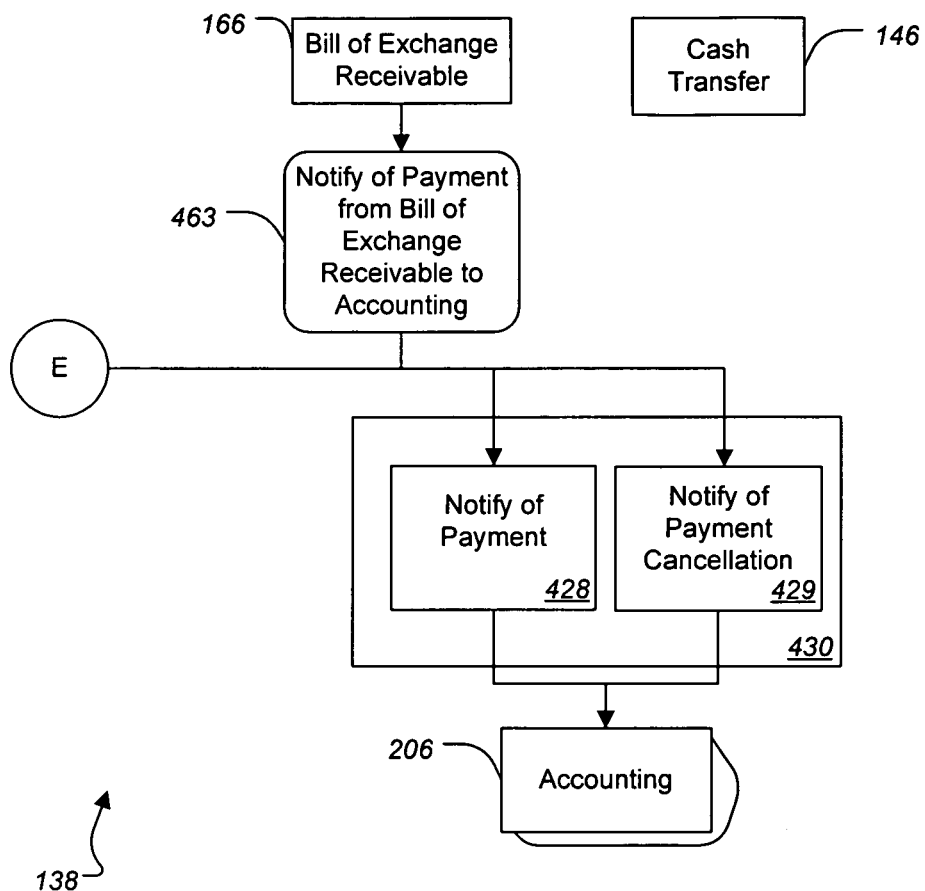

The Payment Order business object 148 can receive updated information and send the update into other components to perform further operations. As shown in FIGS. 4A, 4B and 4D, multiple outbound process agents can receive information from the Payment Order business object 148.

A Confirm Payment Request from Payment Order to Due Item Processing asynchronous outbound process agent 421 can invoke a Confirm Payment Request operation 422 (FIG. 4B). For example, the outbound process agent 421 can send a notification of a confirmed payment. The notification can be sent to the Payment Processing at Business Partner process component 401. The Confirm Payment Request operation 422 is included in a Payment Request Out interface 423.

A Notify of Payment from Payment Order to Business Partner asynchronous outbound process agent 424 can invoke a Notify of Payment operation 425. For example, the outbound process agent 424 can send a notification of a payment. The notification can be sent to the Payment Processing at Business Partner process component 401. The Notify of Payment operation 425 is included in an Outgoing Payment Advicing Out interface 426.

A Notify of Payment from Payment Order to Accounting asynchronous outbound process agent 427 can invoke a Notify of Payment operation 428 (FIG. 4D). For example, the outbound process agent 427 can send a notification of a payment. The notification can be sent to the Accounting process component 206. The Notify of Payment from Payment Order to Accounting asynchronous outbound process agent 427 can also invoke a Notify of Payment Cancellation operation 429. For example, the outbound process agent 427 can send a notification of a payment cancellation. The notification can be sent to the Accounting process component 206. The Notify of Payment operation 428 and the Notify of Payment Cancellation operation 429 are included in a Payment Accounting Out interface 430.

A Change Payment Allocation based on Clearing Request Confirmation operation 431 can send a payment allocation change request using a Change Payment Allocation based on Clearing Request Confirmation asynchronous inbound process agent 432 to update the Payment Allocation business object 142. For example, the operation 431 can send a payment allocation change request to update the Payment Allocation business object 142 if input is received from the Due Item Processing process component 112. The Change Payment Allocation based on Clearing Request Confirmation operation 431 is included in a Clearing In interface 433.

The Payment Allocation business object 142 can receive updated information and send the update into other components to perform further operations. As shown in FIGS. 4A, 4B and 4D, multiple outbound process agents can receive information from the Payment Allocation business object 142.

A Request Clearing Maintenance from Payment Allocation to Due Item Processing asynchronous outbound process agent 434 can invoke a Request Clearing operation 435 (FIG. 4B). For example, the outbound process agent 434 can send a notification of a clearing request based on a payment allocation. The notification can be sent to the Due Item Processing process component 112. The Request Clearing Maintenance from Payment Allocation to Due Item Processing asynchronous outbound process agent 434 can also invoke a Request Clearing Cancellation operation 436. For example, the outbound process agent 434 can send a notification of a clearing request cancellation based on a payment allocation. The notification can be sent to the Due Item Processing process component 112. The Request Clearing operation 435 and the Request Clearing Cancellation operation 436 are included in a Clearing Out interface 437.

A Notify of Payment from Payment Allocation to Accounting asynchronous outbound process agent 438 can invoke the Notify of Payment operation 428. For example, the outbound process agent 438 can send a notification of a payment to accounting. The notification can be sent to the Accounting process component 206. The Notify of Payment from Payment Allocation to Accounting asynchronous outbound process agent 438 can also invoke the Notify of Payment Cancellation operation 429. For example, the outbound process agent 438 can send a notification of a payment cancellation to accounting. The notification can be sent to the Accounting process component 206.

The implementation of the Payment Processing process component 138 is further supported by the Payment Register business object 164, although no operations or process agents involving the business object 164 are explicitly shown in FIG. 4A.

A Create Bank Statement operation 440 (FIG. 4C) can send a bank statement creation request using a Maintain Bank Statement asynchronous inbound process agent 441 to update the Bank Statement business object 170. For example, the operation 440 can send a bank statement creation request to update the Bank Statement business object 170 if input is received from the Bank Statement Creation at Bank process component 402. The Create Bank Statement operation 440 is included in a Bank Statement Processing In interface 442.

The Bank Statement business object 170 can receive updated information and send the update into other components to perform further operations. As shown in FIGS. 4C and 4D, multiple outbound process agents can receive information from the Bank Statement business object 170.

A Notify of Payment from Bank Statement to Accounting asynchronous outbound process agent 443 can invoke the Notify of Payment operation 428 (FIG. 4D). For example, the outbound process agent 443 can send a notification of a payment to accounting. The notification can be sent to the Accounting process component 206. The Notify of Payment from Bank Statement to Accounting asynchronous outbound process agent 443 can also invoke the Notify of Payment Cancellation operation 429. For example, the outbound process agent 443 can send a notification of a payment cancellation to accounting. The notification can be sent to the Accounting process component 206. The Notify of Payment operation 428 and the Notify of Payment Cancellation operation 429 are included in the Payment Accounting Out interface 430.

A Create Payment Advice operation 444 can send a request to create a payment advice using a Maintain Payment Advice asynchronous inbound process agent 445 to update the Payment Advice business object 154. For example, the operation 444 can send a request to create a payment advice to update the Payment Advice business object 154 if input is received from the Payment Processing at Business Partner process component 401. The Create Payment Advice operation 444 is included in an Incoming Payment Advicing In interface 446.

A Process Lock Box operation 447 can send a request to process a lock box using a Process Lock Box asynchronous inbound process agent 448 to update the Incoming Check business object 168. For example, the operation 447 can send a request to process a lock box to update the Incoming Check business object 168 if input is received from the Lock Box File Creation at Provider process component 403. The Process Lock Box operation 447 is included in a Lock Box Processing In interface 449.

The Incoming Check business object 168 can receive updated information and send the update into other components to perform further operations. As shown in FIGS. 4C and 4D, multiple outbound process agents can receive information from the Incoming Check business object 168.

A Notify of Payment from Incoming Check to Accounting asynchronous outbound process agent 450 can invoke the Notify of Payment operation 428 (FIG. 4D). For example, the outbound process agent 450 can send a notification of a payment to accounting. The notification can be sent to the Accounting process component 206. The Notify of Payment from Incoming Check to Accounting asynchronous outbound process agent 450 can also invoke the Notify of Payment Cancellation operation 429. For example, the outbound process agent 450 can send a notification of a payment cancellation to accounting. The notification can be sent to the Accounting process component 206. The Notify of Payment operation 428 and the Notify of Payment Cancellation operation 429 are included in the Payment Accounting Out interface 430.

A Create Cash Payment operation 451 can send a cash payment creation request using a Maintain Cash Payment asynchronous inbound process agent 452 to update the Cash Payment business object 144. For example, the operation 451 can send a cash payment creation request to update the Cash Payment business object 144 if input is received from the Customer Invoice Processing process component 404 or the Due Item Processing process component 112. A Cancel Cash Payment operation 453 can send a cash payment cancellation request, also using the Maintain Cash Payment asynchronous inbound process agent 452 to update the Cash Payment business object 144. For example, the operation 453 can send a cash payment cancellation request to update the Cash Payment business object 144 if input is received from the Customer Invoice Processing process component 404 or the Due Item Processing process component 112. The Create Cash Payment operation 451 and the Cancel Cash Payment operation 453 are included in a Cash Payment In interface 454.

The Cash Payment business object 144 can receive updated information and send the update into other components to perform further operations. As shown in FIGS. 4C and 4D, multiple outbound process agents can receive information from the Cash Payment business object 144.

A Notify of Payment from Cash Payment to Accounting asynchronous outbound process agent 455 can invoke the Notify of Payment operation 428 (FIG. 4D). For example, the outbound process agent 455 can send a notification of a payment to accounting. The notification can be sent to the Accounting process component 206. The Notify of Payment from Cash Payment to Accounting asynchronous outbound process agent 455 can also invoke the Notify of Payment Cancellation operation 429. For example, the outbound process agent 455 can send a notification of a payment cancellation to accounting. The notification can be sent to the Accounting process component 206. The Notify of Payment operation 428 and the Notify of Payment Cancellation operation 429 are included in the Payment Accounting Out interface 430.

The Bill of Exchange Receivable business object 166 can receive updated information and send the update into other components to perform further operations. As shown in FIG. 4D, multiple outbound process agents can receive information from the Bill of Exchange Receivable business object 166.

A Notify of Payment from Bill of Exchange Receivable to Accounting asynchronous outbound process agent 463 can invoke the Notify of Payment operation 428. For example, the outbound process agent 463 can send notification of a bill of exchange receivable. The notification can be sent to the Accounting process component 206. The Notify of Payment from Bill of Exchange Receivable to Accounting asynchronous outbound process agent 463 can also invoke the Notify of Payment Cancellation operation 429. For example, the outbound process agent 463 can send cancellation notification for a bill of exchange receivable. The notification can be sent to the Accounting process component 206. The Notify of Payment operation 428 and the Notify of Payment Cancellation operation 429 are included in the Payment Accounting Out interface 430.

A Change Clearing House Payment Order based on Credit Card Settlement Confirmation operation 466 (FIG. 4E) can send a notification of a credit card settlement using a Change Clearing House Payment Order based on Credit Card Settlement Confirmation asynchronous inbound process agent 467 to update the Clearing House Payment Order business object 150. For example, the operation 466 can send notification of a credit card settlement to update the Clearing House Payment Order business object 150 if input is received from the Settlement Processing at Clearing House process component 407. The Change Clearing House Payment Order based on Credit Card Settlement Confirmation operation 466 is included in a Credit Card Settling In interface 468.

Figure 4E:
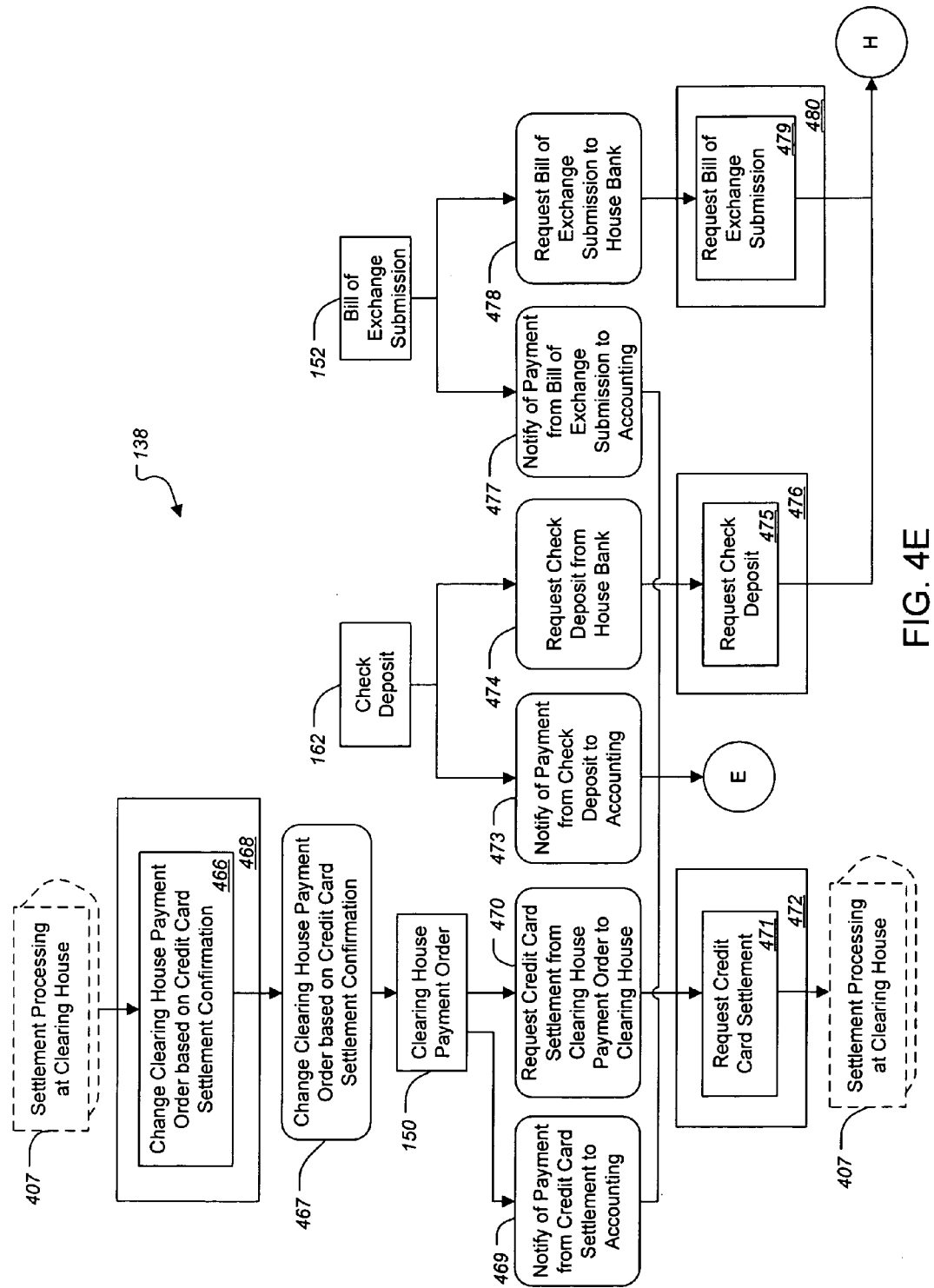

The Clearing House Payment Order business object 150 can receive updated information and send the update into other components to perform further operations. As shown in FIGS. 4D and 4E, multiple outbound process agents can receive information from the Clearing House Payment Order business object 150.

A Notify of Payment from Credit Card Settlement to Accounting asynchronous outbound process agent 469 can invoke the Notify of Payment operation 428 (FIG. 4D). For example, the outbound process agent 469 can send a notification of a credit card payment. The notification can be sent to the Accounting process component 206. The Notify of Payment from Credit Card Settlement to Accounting asynchronous outbound process agent 469 can also invoke the Notify of Payment Cancellation operation 429. For example, the outbound process agent 469 can send a cancellation notification of a credit card payment. The notification can be sent to the Accounting process component 206.

A Request Credit Card Settlement from Clearing House Payment Order to Clearing House asynchronous outbound process agent 470 can invoke a Request Credit Card Settlement operation 471. For example, the outbound process agent 470 can send a notification of a credit card payment. The notification can be sent to the Settlement Processing at Clearing House process component 407. The Request Credit Card Settlement operation 471 is included in a Credit Card Settling Out interface 472.

The Check Deposit business object 162 can receive updated information and send the update into other components to perform further operations. As shown in FIGS. 4D and 4E, multiple outbound process agents can receive information from the Check Deposit business object 162.

A Notify of Payment from Check Deposit to Accounting asynchronous outbound process agent 473 can invoke the Notify of Payment operation 428 (FIG. 4D). For example, the outbound process agent 473 can send a notification of check deposit. The notification can be sent to the Accounting process component 206. The Notify of Payment from Check Deposit to Accounting asynchronous outbound process agent 473 can also invoke the Notify of Payment Cancellation operation 429. For example, the outbound process agent 473 can send a cancellation notification of a check deposit. The notification can be sent to the Accounting process component 206.

A Request Check Deposit from House Bank asynchronous outbound process agent 474 can invoke a Request Check Deposit operation 475. For example, the outbound process agent 474 can send a notification of a check deposit. The notification can be sent to the Payment Order Processing at House Bank process component 408. The Request Check Deposit operation 475 is included in a Check Depositing Out interface 476.

The Bill of Exchange Submission business object 152 can receive updated information and send the update into other components to perform further operations. As shown in FIGS. 4D and 4E, multiple outbound process agents can receive information from the Bill of Exchange Submission business object 152.

A Notify of Payment from Bill of Exchange Submission to Accounting asynchronous outbound process agent 477 can invoke the Notify of Payment operation 428. For example, the outbound process agent 477 can send a notification of a bill of exchange submission. The notification can be sent to the Accounting process component 206. The Notify of Payment from Bill of Exchange Submission to Accounting asynchronous outbound process agent 477 can also invoke the Notify of Payment Cancellation operation 429. For example, the outbound process agent 477 can send a cancellation notification of a bill of exchange submission. The notification can be sent to the Accounting process component 206.

A Request Bill of Exchange Submission to House Bank asynchronous outbound process agent 478 can invoke a Request Bill of Exchange Submission operation 479. For example, the outbound process agent 478 can send a notification of a bill of exchange submission. The notification can be sent to the Payment Order Processing at House Bank process component 408. The Request Bill of Exchange Submission operation 479 is included in a Bill of Exchange Submitting Out interface 480.

Figure 4F:
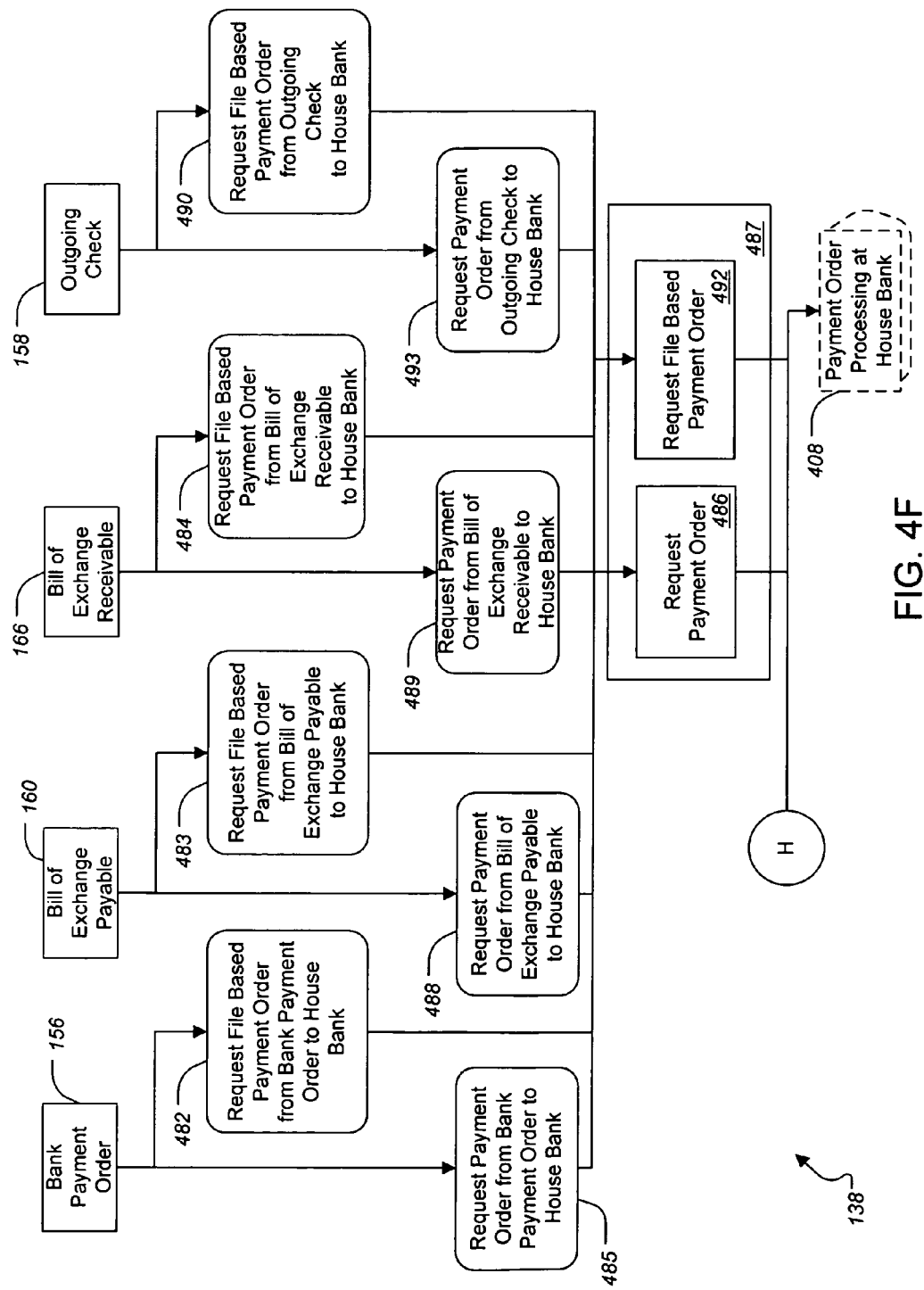

The Bank Payment Order business object 156 (FIG. 4F) can receive updated information and send the update into other components to perform further operations. As shown in FIG. 4F, multiple outbound process agents can receive information from the Bank Payment Order business object 156.

A Request Payment Order from Bank Payment Order to House Bank asynchronous outbound process agent 485 can invoke a Request Payment Order operation 486. For example, the outbound process agent 485 can send a notification of a bank payment order. The notification can be sent to the Payment Order Processing at House Bank process component 408. A Request File Based Payment Order from Bank Payment Order to House Bank asynchronous outbound process agent 482 can invoke a Request File Based Payment Order operation 492. For example, the outbound process agent 482 can send a request for a file based payment order. The notification can be sent to the Payment Order Processing at House Bank process component 408. The Request Payment Order operation 486 and the Request File Based Payment Order operation 492 are included in a Payment Ordering Out interface 487.

The Bill of Exchange Payable business object 160 can receive updated information and send the update into other components to perform further operations. As shown in FIG. 4F, multiple outbound process agents can receive information from the Bill of Exchange Payable business object 160.

A Request Payment Order from Bill of Exchange Payable to House Bank asynchronous outbound process agent 488 can invoke the Request Payment Order operation 486. For example, the outbound process agent 488 can send a notification of the bill of exchange payable. The notification can be sent to the Payment Order Processing at House Bank process component 408. A Request File Based Payment Order from Bill of Exchange Payable to House Bank asynchronous outbound process agent 483 can invoke a Request File Based Payment Order operation 492. For example, the outbound process agent 483 can send a request for a file based payment order. The notification can be sent to the Payment Order Processing at House Bank process component 408.

The Bill of Exchange Receivable business object 166 can receive updated information and send the update into other components to perform further operations. As shown in FIG. 4F, multiple outbound process agents can receive information from the Bill of Exchange Receivable business object 166.

A Request Payment Order from Bill of Exchange Receivable to House Bank asynchronous outbound process agent 489 can invoke the Request Payment Order operation 486. For example, the outbound process agent 489 can send a notification of a bill of exchange receivable. The notification can be sent to the Payment Order Processing at House Bank process component 408. A Request File Based Payment Order from Bill of Exchange Receivable to House Bank asynchronous outbound process agent 484 can invoke a Request File Based Payment Order operation 492. For example, the outbound process agent 484 can send a request for a file based payment order. The notification can be sent to the Payment Order Processing at House Bank process component 408.

The Outgoing Check business object 158 can receive updated information and send the update into other components to perform further operations. As shown in FIG. 4F, multiple outbound process agents can receive information from the Outgoing Check business object 158.

A Request Payment Order from Outgoing Check to House Bank asynchronous outbound process agent 493 can invoke the Request Payment Order operation 486. For example, the outbound process agent 493 can send a notification of an outgoing check. The notification can be sent to the Payment Order Processing at House Bank process component 408. A Request File Based Payment Order from Outgoing Check to House Bank asynchronous outbound process agent 490 can invoke a Request File Based Payment Order operation 492. For example, the outbound process agent 490 can send a request for a file based payment order. The notification can be sent to the Payment Order Processing at House Bank process component 408.

FIGS. 5A, 5B, 5C, 5D, and 5E are block diagrams collectively showing the Due Item Processing process component 112 (FIG. 1B). For convenience in describing this process component, a number of other process components are shown in the figures; these other process components are not part of the process component being described. These other process components are a Credit Management process component 502, a Supplier Invoice Processing process component 508, a Customer Invoice Processing process component 510, the Expense and Reimbursement Management process component 102, the Cash Management process component 140, the Payment Processing process component 138, a Processing of European Community Sales List Report at Tax Authority process component 584, a Processing of Product Tax Declaration at Tax Authority process component 512, the Accounting process component 206, and the Payment Processing process component 138. These other process components are used to represent software external to the process component in describing its interactions with the external software; however, while the external software can be implemented as such process components, this is not required.

Figure 5A:
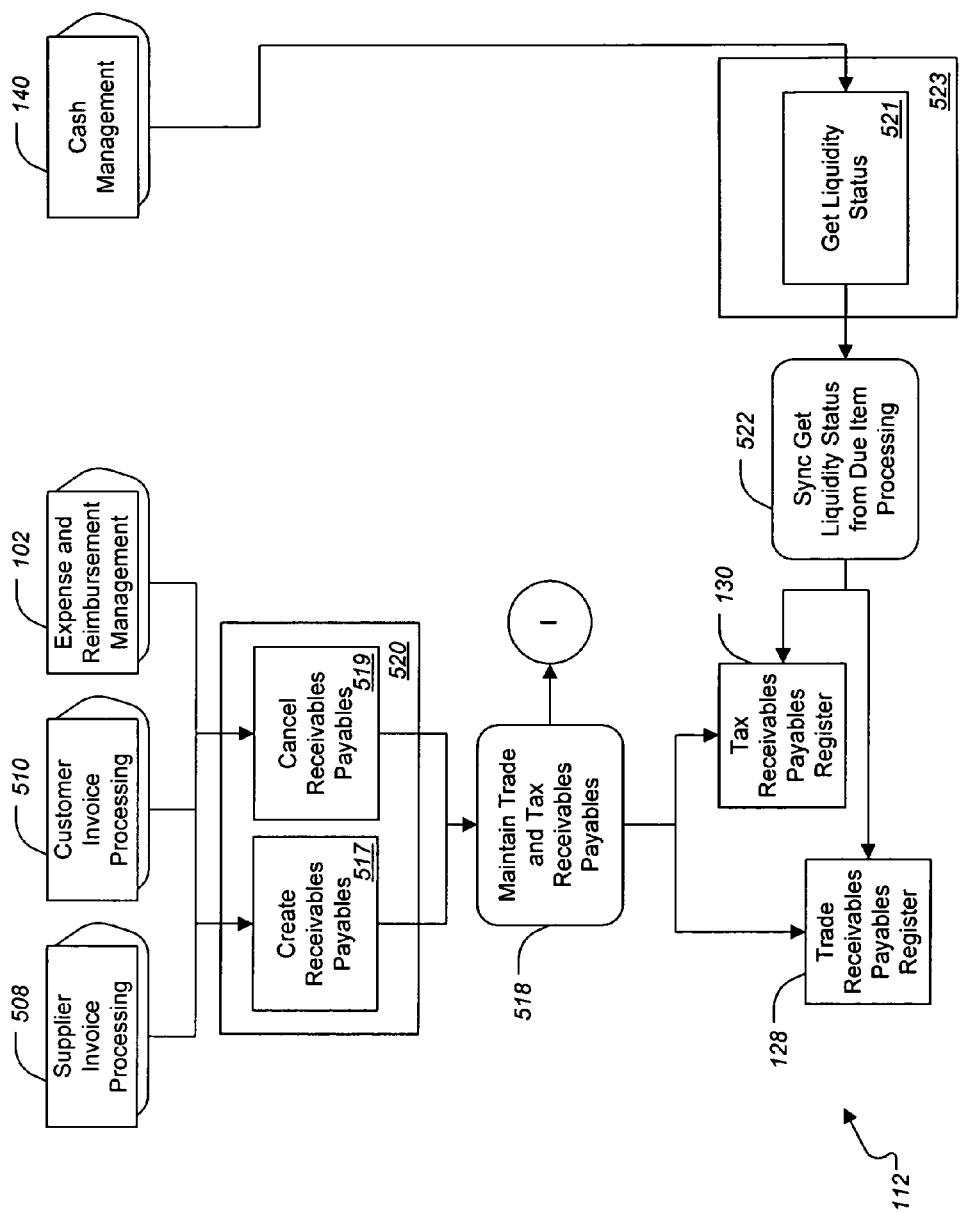
FIGS. 5A, 5B, 5C, 5D and 5E are block diagrams collectively showing a due item processing process component.
Figure 5B:
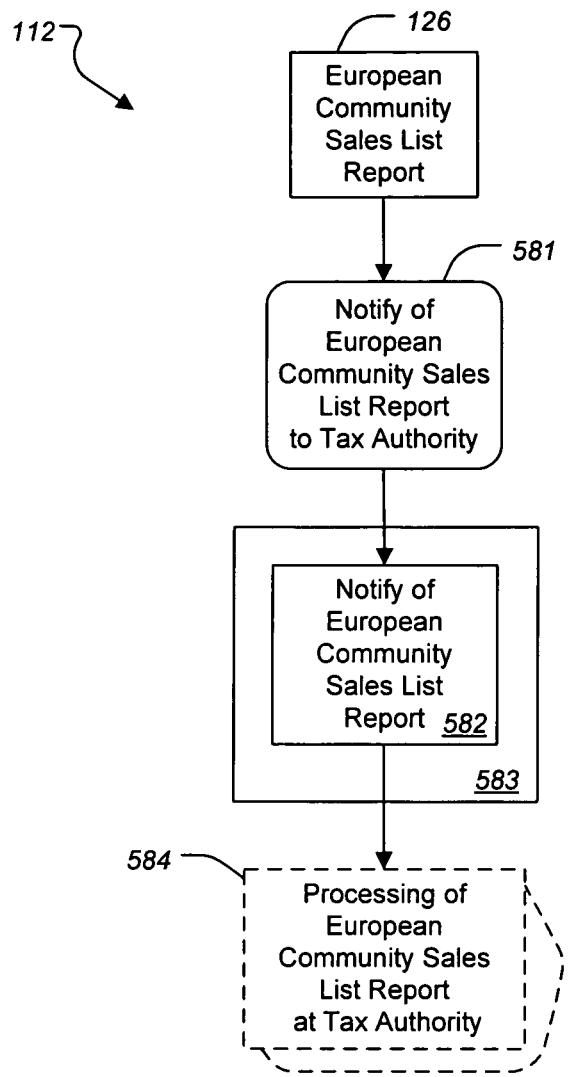
Figure 5C:
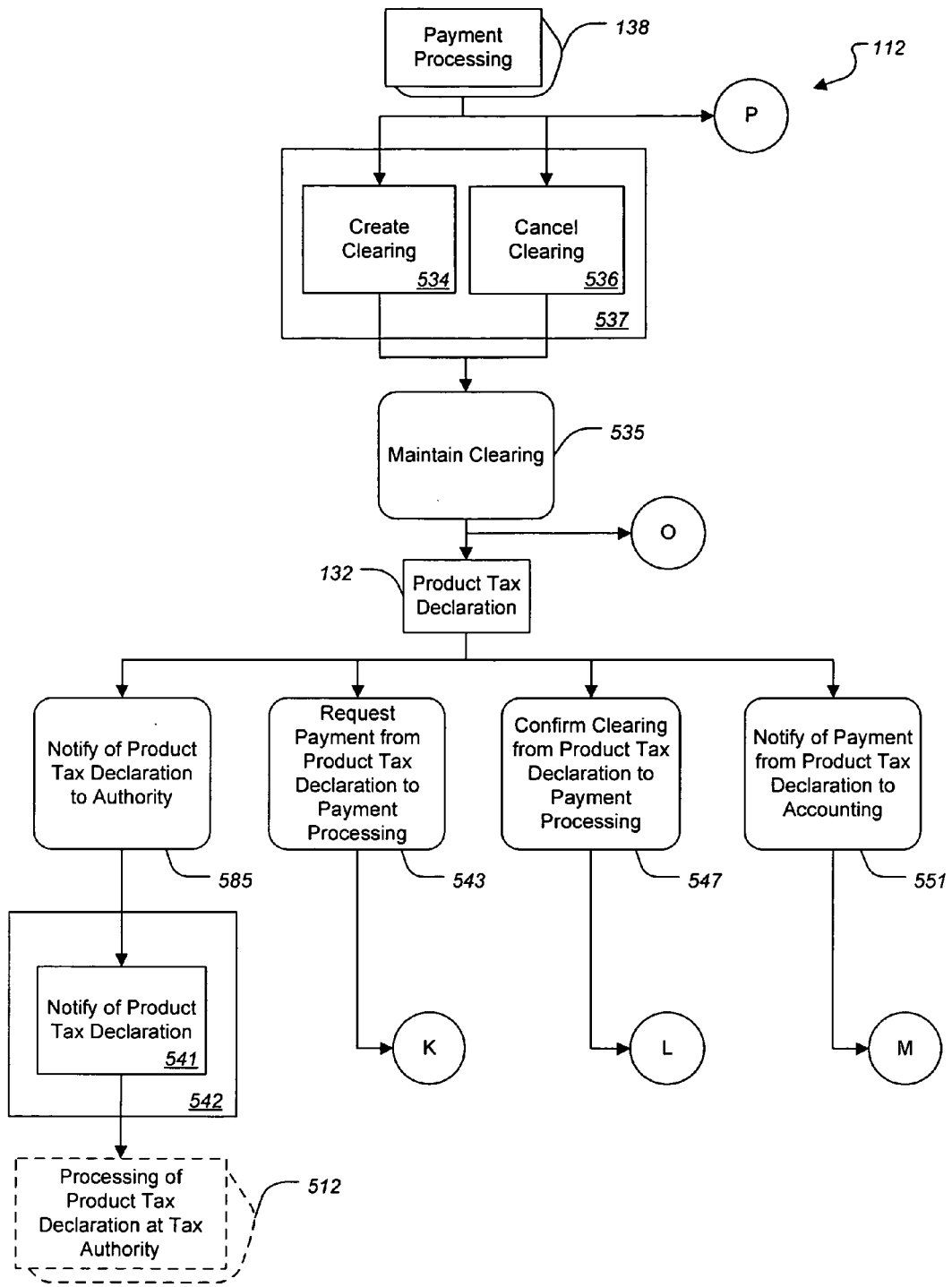
Figure 5D:
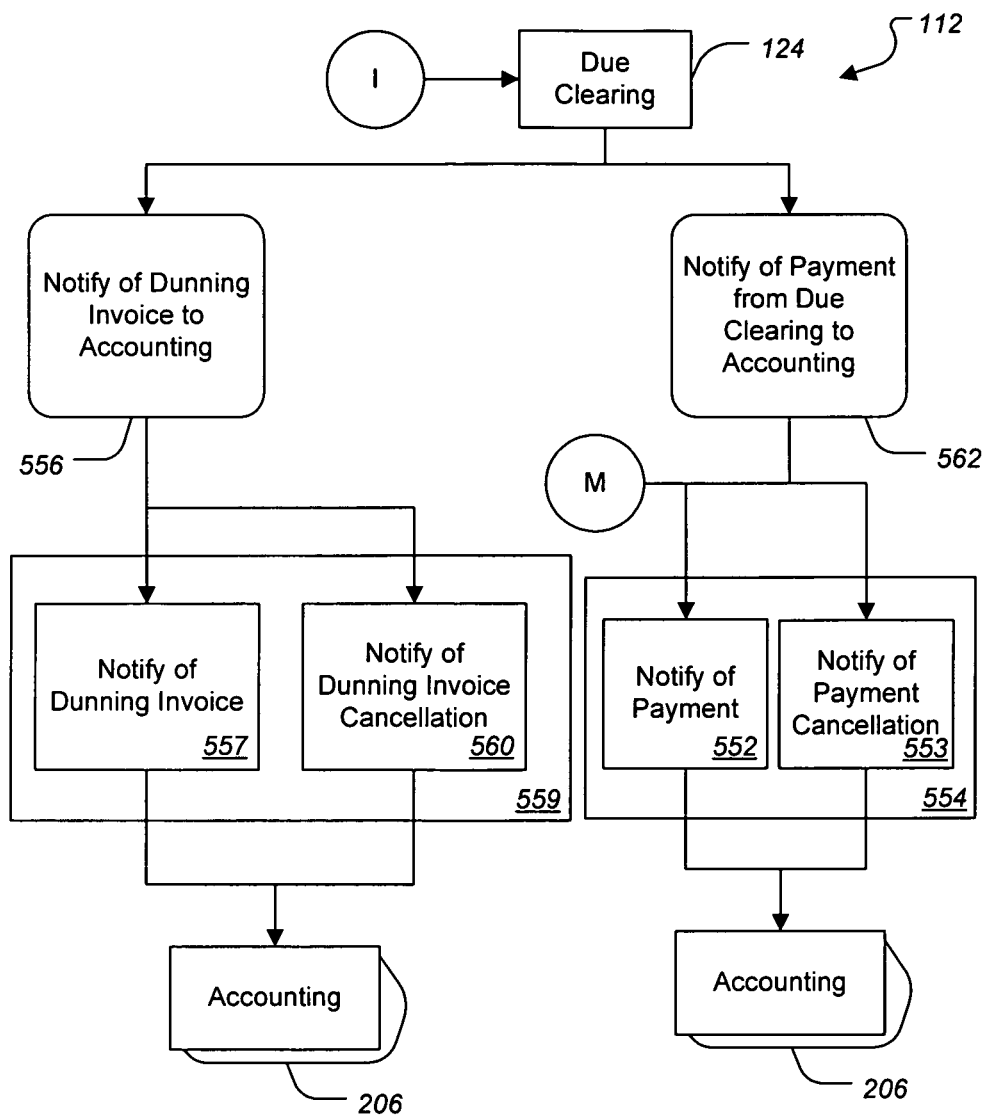

A Create Receivables Payables operation 517 can send a receivables or payables creation request using a Maintain Trade and Tax Receivables Payables asynchronous inbound process agent 518 to update three business objects: the Trade Receivables Payables Register business object 128, the Tax Receivables Payables Register business object 130, and the Due Clearing business object 124 (FIG. 5D). For example, the operation 517 can send a receivables or payables creation request to update to the business objects 128, 130 and 124 if input is received from any of several process components: the Supplier Invoice Processing process component 508, the Customer Invoice Processing process component 510, or the Expense and Reimbursement Management process component 102.

Similarly, a Cancel Receivables Payables operation 519 can send a receivables or payables cancellation request, also using the Maintain Trade and Tax Receivables Payables asynchronous inbound process agent 518 to update three business objects: the Trade Receivables Payables Register business object 128, the Tax Receivables Payables Register business object 130, and the Due Clearing business object 124. For example, the operation 519 can send a receivables or payables cancellation request to update the business objects 128, 130 and 124 if input is received from any of several process components: the Supplier Invoice Processing process component 508, the Customer Invoice Processing process component 510, or the Expense and Reimbursement Management process component 102.

The Create Receivables Payables operation 517 and the Cancel Receivables Payables operation 519 are included in a Receivables Payables In interface 520.

A Get Liquidity Status operation 521 can send a liquidity status query using a Synchronous Get Liquidity Status from Due Item Processing synchronous inbound process agent 522 to query the Trade Receivables Payables Register business object 128 and the Tax Receivables Payables Register business object 130. For example, the operation 521 can send a liquidity status query to the business objects 128 and 130 if input is received from the Cash Management process component 140. The Get Liquidity Status operation 521 is included in a Liquidity Status In interface 523.

The Trade Receivables Payables Register business object 128 can receive updated information and send the update into other components to perform further operations. As shown in FIGS. 5A and 5B, multiple outbound process agents can receive information from the Trade Receivables Payables Register business object 128.

A Notify of European Community Sales List Report to Tax Authority asynchronous outbound process agent 581 can invoke a Notify of European Community Sales List Report operation 582. For example, the outbound process agent 581 can send a notification of a European community sales list report. The notification can be sent to the Processing of European Community Sales List Report at Tax Authority process component 584. The Notify of European Community Sales List Report operation 582 is included in a European Community Sales List Report Out interface 583.

Figure 5E:
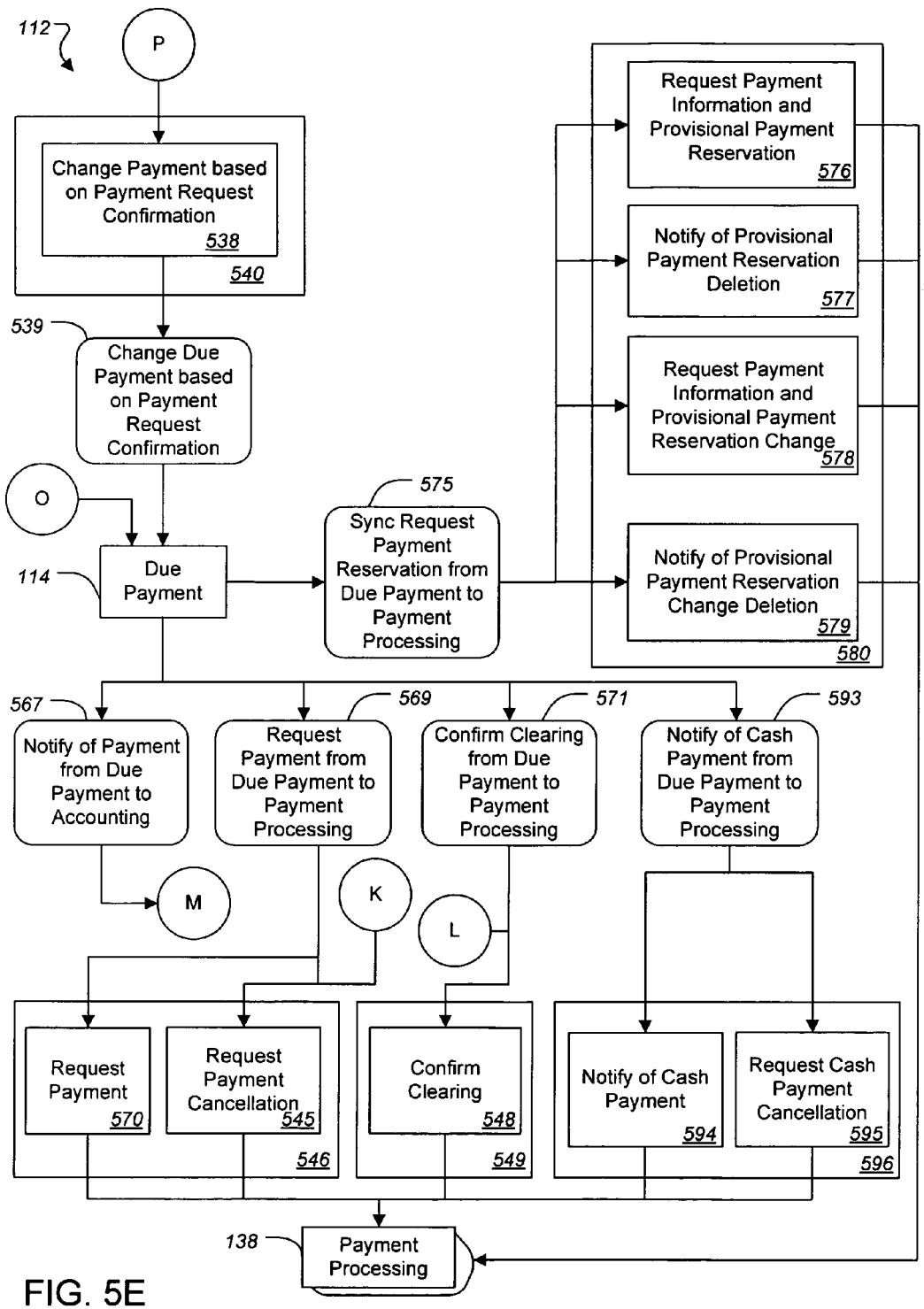

A Create Clearing operation 534 can send a create clearing request using a Maintain Clearing asynchronous inbound process agent 535 to update the Product Tax Declaration business object 132 and the Due Payment business object 104 (FIG. 5E). For example, the operation 534 can send a create clearing request to update the Product Tax Declaration business object 132 and the Due Payment business object 104 if input is received from the Payment Processing process component 138. A Cancel Clearing operation 536 can send a cancel clearing request, also using the Maintain Clearing asynchronous inbound process agent 535 to update the Product Tax Declaration business object 132 and the Due Payment business object 104. For example, the operation 536 can send a cancel clearing request to update the Product Tax Declaration business object 132 and the Due Payment business object 104 if input is received from the Payment Processing process component 138. The Create Clearing operation 534 and the Cancel Clearing operation 536 are included in a Clearing In interface 537.

A Change Payment based on Payment Request Confirmation operation 538 (FIG. 5E) can send a payment change request using a Change Due Payment based on Payment Request Confirmation asynchronous inbound process agent 539 to update the Due Payment business object 114. For example, the operation 538 can send a payment change request to update the Due Payment business object 114 if input is received from the Payment Processing process component 138. The Change Payment based on Payment Request Confirmation operation 538 is included in a Payment Request In interface 540.

The Product Tax Declaration business object 132 can receive updated information and send the update into other components to perform further operations. As shown in FIGS. 5C, 5D and 5E, multiple outbound process agents can receive information from the Product Tax Declaration business object 132.

A Notify of Product Tax Declaration to Authority asynchronous outbound process agent 585 can invoke a Notify of Product Tax Declaration operation 541. For example, the outbound process agent 585 can send a notification of a product tax declaration. The notification can be sent to the Processing of Product Tax Declaration at Tax Authority process component 512. The Notify of Product Tax Declaration operation 541 is included in a Product Tax Declaration Out interface 542.

A Request Payment from Product Tax Declaration to Payment Processing asynchronous outbound process agent 543 can invoke a Request Payment Cancellation operation 545 (FIG. 5E). For example, the outbound process agent 543 can send a notification of a payment cancellation request. The notification can be sent to the Payment Processing process component 138. The Request Payment Cancellation operation 545 is included in a Payment Request Out interface 546.

A Confirm Clearing from Product Tax Declaration to Payment Processing asynchronous outbound process agent 547 can invoke a Confirm Clearing operation 548 (FIG. 5E). For example, the outbound process agent 547 can send a notification of clearing confirmation based on a product tax declaration. The notification can be sent to the Payment Processing process component 138. The Confirm Clearing operation 548 is included in a Clearing Out interface 549.

A Notify of Payment from Product Tax Declaration to Accounting asynchronous outbound process agent 551 can invoke a Notify of Payment operation 552 (FIG. 5D). For example, the outbound process agent 551 can send a notification of a payment. The notification can be sent to the Accounting process component 206. The Notify of Payment from Product Tax Declaration to Accounting asynchronous outbound process agent 551 can also invoke a Notify of Payment Cancellation operation 553. For example, the outbound process agent 551 can send a notification of a cancelled payment. The notification can be sent to the Accounting process component 206. The Notify of Payment operation 552 and the Notify of Payment Cancellation operation 553 are included in a Payment Accounting Out interface 554.

The Due Clearing business object 124 can receive updated information and send the update into other components to perform further operations. As shown in FIG. 5D, multiple outbound process agents can receive information from the Due Clearing business object 124.

A Notify of Dunning Invoice to Accounting asynchronous outbound process agent 556 can invoke a Notify of Dunning Invoice operation 557. For example, the outbound process agent 556 can send a notification of a dunning invoice. The notification can be sent to the Accounting process component 206. The Notify of Dunning Invoice to Accounting asynchronous outbound process agent 556 can also invoke a Notify of Dunning Invoice Cancellation operation 560. For example, the outbound process agent 556 can send a cancellation notification of a dunning invoice. The notification can be sent to the Accounting process component 206. The Notify of Dunning Invoice operation 557 and the Notify of Dunning Invoice Cancellation operation 560 are included in a Dunning Invoice Accounting Out interface 559.

A Notify of Payment from Due Clearing to Accounting asynchronous outbound process agent 562 can invoke the Notify of Payment operation 552. For example, the outbound process agent 562 can send a notification of a cleared payment. The notification can be sent to the Accounting process component 206. The Notify of Payment from Due Clearing to Accounting asynchronous outbound process agent 562 can also invoke the Notify of Payment Cancellation operation 553. For example, the outbound process agent 562 can send a notification of a cancelled payment. The notification can be sent to the Accounting process component 206.

The Due Payment business object 114 can receive updated information and send the update into other components to perform further operations. As shown in FIGS. 5D and 5E, multiple outbound process agents can receive information from the Due Payment business object 114.

A Notify of Payment from Due Payment to Accounting asynchronous outbound process agent 567 can invoke the Notify of Payment operation 552. For example, the outbound process agent 567 can send a notification of a payment received in due processing. The notification can be sent to the Accounting process component 206. The Notify of Payment from Due Payment to Accounting asynchronous outbound process agent 567 can also invoke the Notify of Payment Cancellation operation 553. For example, the outbound process agent 562 can send a notification of a cancelled payment. The notification can be sent to the Accounting process component 206.

A Request Payment from Due Payment to Payment Processing asynchronous outbound process agent 569 can invoke a Request Payment operation 570. For example, the outbound process agent 569 can send a request for a payment. The notification can be sent to the Payment Processing process component 138. The Request Payment from Due Payment to Payment Processing asynchronous outbound process agent 569 can also invoke the Request Payment Cancellation operation 545. For example, the outbound process agent 569 can send a notification of a payment cancellation request. The notification can be sent to the Payment Processing process component 138. The Request Payment operation 570 and the Request Payment Cancellation operation 545 are included in the Payment Request Out interface 546.

A Confirm Clearing from Due Payment to Payment Processing asynchronous outbound process agent 571 can invoke the Confirm Clearing operation 548. For example, the outbound process agent 571 can send a notification of a payment that cleared to due payment. The notification can be sent to the Payment Processing process component 138. The Confirm Clearing operation 548 is included in the Clearing Out interface 549.

A Notify of Cash Payment from Due Payment to Payment Processing asynchronous outbound process agent 593 can invoke the Notify of Cash Payment operation 594. For example, the outbound process agent 593 can send a notification of a cash payment that cleared to due payment. The notification can be sent to the Payment Processing process component 138. The Notify of Cash Payment from Due Payment to Payment Processing asynchronous outbound process agent 593 can also invoke the Request Cash Payment Cancellation operation 595. For example, the outbound process agent 593 can send a request to cancel a cash payment. The request can be sent to the Payment Processing process component 138. The Notify of Cash Payment operation 594 and the Request Cash Payment Cancellation operation 595 are included in the Cash Payment Out interface 596.

A Synchronous Request Payment Reservation from Due Payment to Payment Processing synchronous outbound process agent 575 can invoke a Request Payment Information and Provisional Payment Reservation operation 576. For example, the outbound process agent 575 can send a request for payment information and a provisional payment reservation. The request can be sent to the Payment Processing process component 138.

The Synchronous Request Payment Reservation from Due Payment to Payment Processing synchronous outbound process agent 575 can also invoke a Notify of Provisional Payment Reservation Deletion operation 577. For example, the outbound process agent 575 can send a notification of a provisional payment reservation deletion. The notification can be sent to the Payment Processing process component 138.

The Synchronous Request Payment Reservation from Due Payment to Payment Processing synchronous outbound process agent 575 can also invoke a Request Payment Information and Provisional Payment Reservation Change operation 578. For example, the outbound process agent 575 can send a request for payment information and a provisional payment reservation change. The request can be sent to the Payment Processing process component 138.

The Synchronous Request Payment Reservation from Due Payment to Payment Processing synchronous outbound process agent 575 can also invoke a Notify of Provisional Payment Reservation Change Deletion operation 579. For example, the outbound process agent 575 can send a notification of a provisional payment reservation change deletion. The notification can be sent to the Payment Processing process component 138.

The Request Payment Information and Provisional Payment Reservation operation 576, the Notify of Provisional Payment Reservation Deletion operation 577, the Request Payment Information and Provisional Payment Reservation Change operation 578, and the Notify of Provisional Payment Reservation Change Deletion operation 579 are included in a Payment Request Out interface 580.

The implementation of the Due Item Processing process component 112 is further supported by several business objects, although no operations or process agents involving the business object 164 are explicitly shown in FIG. 5B. These business objects are the Withholding Tax Declaration business object 122 and the Trade Receivables Payables Account business object 134.

Figure 6:
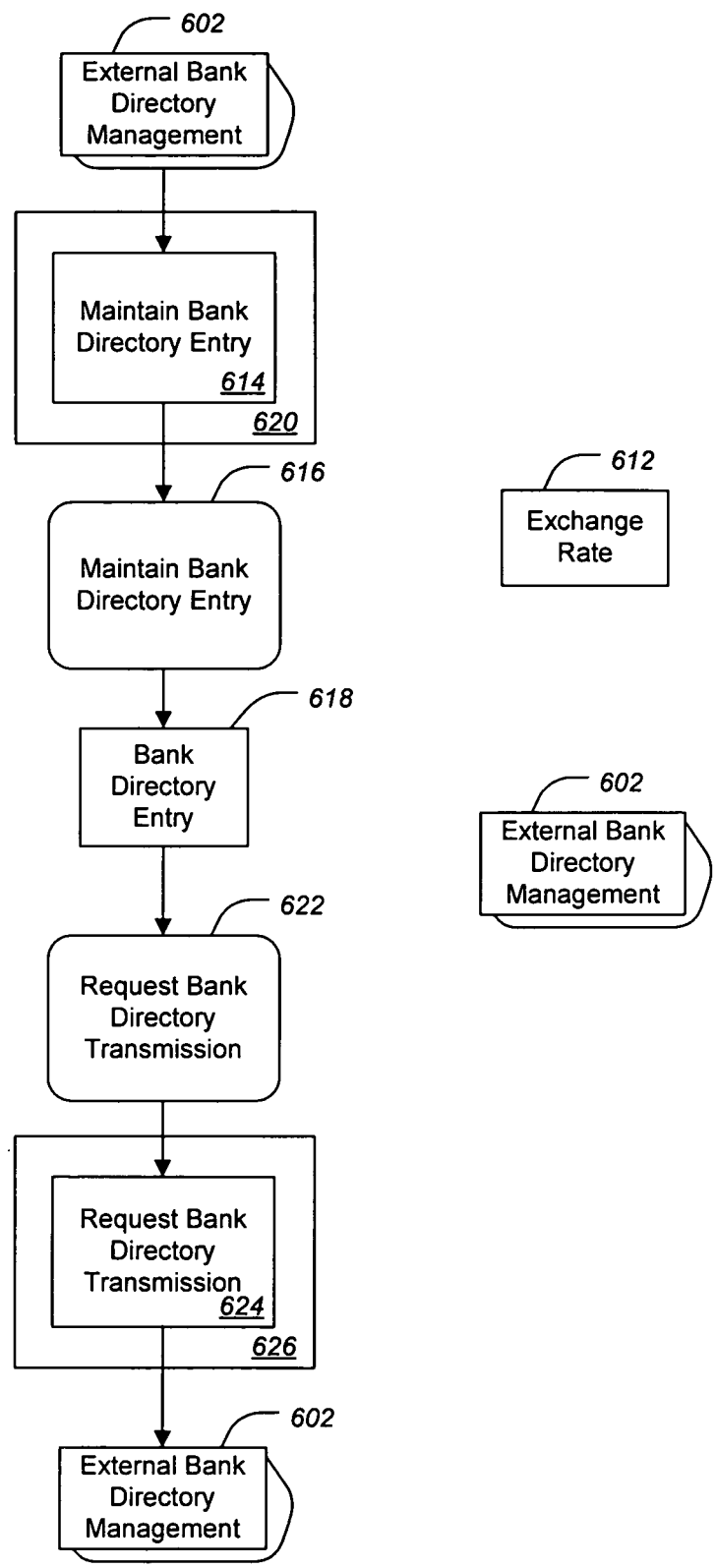
FIG. 6 is a block diagram showing a financial market data management process component.

FIG. 6 is a block diagram showing the Financial Market Data Management process component 190. The process component is included in the foundation layer. As shown, a Bank Directory Entry master data object 194 can receive updated information and send the update into other components to perform further operations. As shown in FIG. 6, multiple outbound process agents can receive information from the Bank Directory Entry master data object 194.

A Maintain Bank Directory Entry operation 614 can send a bank directory entry request using a Maintain Bank Directory Entry asynchronous inbound process agent 616 to update the Bank Directory Entry business object 604. For example, the operation 614 can send a bank directory entry request to update the Bank Directory Entry business object 604 if input is received from the External Bank Directory Management process component 602. The Maintain Bank Directory Entry operation 614 is included in a Bank Directory Transmission In interface 620.

A Request Bank Directory Transmission asynchronous outbound process agent 622 can invoke a Request Bank Directory Transmission operation 624. For example, the outbound process agent 622 can send a notification of an entry that was made in the bank. The notification can be sent to the External Bank Directory Management process component 602. The Request Bank Directory Transmission operation 624 is included in a Bank Directory Transmission Requesting Out interface 626.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A non-transitory computer readable storage medium including instructions executed by at least one processor for providing message-based services using a service-oriented methodology for implementing an instance of an expense and reimbursement management deployment unit, the instructions operable when executed by the at least one processor to:
store an instance of the expense and reimbursement management deployment unit for processing an arrangement made by a company for an employee for expense reporting, where the expense and reimbursement management deployment unit defines the limits of an application-defined transaction for processing an arrangement made by a company for an employee for expense reporting by a set of actions that have atomicity, consistency, isolation, and durability in a database, and wherein the actions associated with the application-defined transaction are performed by at least one process component contained in the expense and reimbursement management deployment unit, wherein each process component comprises a software package realizing a business process and exposing the process component's functionality as at least one service operation, wherein the expense and reimbursement management deployment unit comprises:
a maintain expense arrangement operation, a request project task availability information operation, a notify of expense report operation, a request expense report cancellation operation, a notify of settlement result operation, and a notify of settlement result cancellation operation;
wherein the service operations of the expense and reimbursement deployment unit are packaged together to be deployed on a single computer system;
execute the application-defined transaction for processing the arrangement made by a company for an employee for expense reporting; and
present data associated with the executed application-defined transaction for processing the arrangement made by a company for an employee for expense reporting to a graphical user interface.

2. The medium of claim 1, wherein the expense and reimbursement deployment unit further comprises an expense and reimbursement management process component.

3. The medium of claim 2, wherein the expense and reimbursement management process component implements the maintain expense arrangement operation, the request project task availability information operation, the notify of expense report operation, the request expense report cancellation operation, the notify of settlement result operation, and the notify of settlement result cancellation operation.

4. The medium of claim 2, wherein the expense and reimbursement management process component comprises an expense arrangement business object and an expense report business object.

5. The medium of claim 1, wherein the service operations are grouped into service interfaces, the service interfaces comprising:
a personnel administration in interface that includes the maintain expense arrangement operation;
a project task availability out interface that includes the request project task availability information operation;
a payables out interface that includes the notify of expense report operation and the request expense report cancellation operation; and
an expense accounting out interface that includes the notify of settlement result operation and the notify of settlement result cancellation operation.

6. The medium of claim 1, wherein the single computer system comprises a single physical hardware platform.

7. A non-transitory computer readable storage medium including instructions executed by at least one processor for providing message-based services using a service-oriented methodology for implementing an instance of a due item management deployment unit, the instructions operable when executed by the at least one processor to:
store an instance of the due item management deployment unit for processing due payment and receivables, where the due item management deployment unit defines the limits of an application-defined transaction for processing due payment and receivables by a set of actions that have atomicity, consistency, isolation, and durability in a database, and wherein the actions associated with the application-defined transaction are performed by at least one process component contained in the due item management deployment unit, wherein each process component comprises a software package realizing a business process and exposing the process component's functionality as at least one service operation, wherein the due item management deployment unit comprises:
a create receivables payables operation for sending a receivables or payables creation request to update at least one of a trade receivables payables register business object, a tax receivables payables register business object, and a due clearing business object,
a cancel receivables payables operation for sending a receivables or payables cancellation request to update at least one of the trade receivables payables register business object, the tax receivables payables register business object, and the due clearing business object,
a get liquidity status operation for sending a query request to the trade receivables payables register business object and the tax receivables payables register business object,
a notify of European Community sales list report operation for sending notification of a European community sales list report,
a create clearing operation for sending a create clearing request to update a product tax declaration business object and the due payment business object,
a cancel clearing operation for sending a cancel clearing request to cancel a previously created clearing request and to update the product tax declaration business object and the due payment business object,
a notify of product tax declaration operation for sending a notification of a product tax declaration to update a product tax declaration business object,
a notify of dunning invoice operation for sending a notification of a dunning invoice to accounting,
a notify of dunning invoice cancellation operation for sending a cancellation notification of a previously-notified dunning invoice to accounting,
a notify of payment operation for sending a notification of a cleared payment to accounting,
a notify of payment cancellation for sending a notification of a cancelled payment to accounting,
a change payment based on payment request confirmation operation for sending a payment change request to update the due payment business object, a request payment information and provisional payment reservation operation for sending a request for payment information and a provisional payment reservation to payment processing, a notify of provisional payment reservation deletion operation for sending a notification of deletion of a provisional payment reservation to payment processing, a request payment information and provisional payment reservation change operation for sending a request for payment information and a provisional payment reservation change to payment processing, a notify of provision payment reservation change deletion operation for sending a notification of deletion of a provisional payment reservation deletion to payment processing, a request payment operation for sending a request for payment to payment processing, a request payment cancellation for sending a notification of a payment cancellation request associated with a previously-sent payment request to payment processing, a confirm clearing operation for sending to payment processing a notification of a payment that cleared to due payment, a notify of cash payment operation for sending to payment processing a notification of a cash payment that cleared to due payment, and a request cash payment cancellation operation for sending to payment processing a request to cancel a cash payment;

wherein the service operations of the due item management deployment unit are packaged together to be deployed on a single computer system;

execute the application-defined transaction for processing due payment and receivables; and present data associated with the executed application-defined transaction for processing due payment and receivables to a graphical user interface.

8. The medium of claim 7, wherein the due item management deployment unit further comprises a due item management processing process component.

9. The medium of claim 8, wherein the due item management processing process component implements the create receivables payables operation, the cancel receivables payables operation, the get liquidity status operation, the notify of European Community sales list report operation, the create clearing operation, the cancel clearing operation, the notify of product tax declaration operation, the notify of dunning invoice operation, the notify of dunning invoice cancellation operation, the notify of payment operation, the notify of payment cancellation, the change payment based on payment request confirmation operation, the request payment information and provisional payment reservation operation, the notify of provisional payment reservation deletion operation, the request payment information and provisional payment reservation change operation, the notify of provisional payment reservation change deletion operation, the request payment operation, the request payment cancellation, the confirm clearing operation, the notify of cash payment operation, and the request cash payment cancellation operation.

10. The medium of claim 8, wherein the due item management processing process component comprises a due payment business object, a dunning business object, a debt guarantee business object, a factoring business object, a withholding tax declaration business object, a due payment run business object, a due clearing business object, a dunning run business object, a European Community sales list report business object, a trade receivables payables register business object, a tax receivables payables register business object, a trade receivables payables account master data object, and a product tax declaration business object.

11. The medium of claim 7, wherein the service operations are grouped into service interfaces, the service interfaces comprising:

a receivables payables in interface that includes the create receivables payables operation and the cancel receivables payables operation;

a liquidity status in interface that includes the get liquidity status operation;

a European Community sales list report out interface that includes the notify of European Community sales list report operation;

a clearing in interface that includes the create clearing operation and the cancel clearing operation;

a payment request in interface that includes the change payment based on payment request confirmation operation;

a product tax declaration out interface that includes the notify of product tax declaration operation;

a clearing out interface that includes the confirm clearing operation;

a payment accounting out interface that includes the notify of payment operation and the notify of payment cancellation operation;

a dunning invoice accounting out interface that includes the notify of dunning invoice operation and the notify of dunning invoice cancellation operation;

a payment request out interface that includes the request payment operation and the request payment cancellation operation;

a cash payment out interface that includes the notify of cash payment operation and the request cash payment cancellation operation; and a payment request out interface that includes the request payment information and provisional payment reservation operation, the notify of provisional payment reservation deletion operation, the request payment information and provisional payment reservation change operation, and the notify of provisional payment reservation change deletion operation.

12. The medium of claim 7, wherein the single computer system comprises a single physical hardware platform.

13. A non-transitory computer readable storage medium including instructions executed by at least one processor for providing message-based services using a service-oriented methodology for implementing an instance of a payment deployment unit, the instructions operable when executed by the at least one processor to:

store an instance of the payment deployment unit for processing payment information, where the payment deployment unit defines the limits of an application-defined transaction for processing payment information by a set of actions that have atomicity, consistency, isolation, and durability in a database, and where the actions associated with the application-defined transaction are performed by at least one process component contained in the payment deployment unit, wherein each process component comprises a software package realizing a business process and exposing the process component's functionality as at least one service operation, wherein the payment deployment unit comprises:

a cash management process component, wherein the cash management process component implements the following service operations:
  a query liquidity status operation for synchronizing liquidity forecast status information in at least one other process component;
a payment processing process component, wherein the payment processing process component implements the following service operations:
  a create payment reservation operation for sending a payment reservation creation request to update a payment order business object,
  a cancel payment reservation operation for sending a payment reservation cancellation request to update the payment order business object,
  a synchronous change payment reservation operation for sending a payment reservation synchronize change request to update the payment order business object,
  a change payment reservation operation for sending a payment reservation change request to update the payment order business object,
  a create payment order operation for sending a payment order creation request to update the payment order business object,
  a cancel payment order operation for sending a payment order cancellation request to update the payment order business object,
  a change payment allocation based on clearing request confirmation operation for sending a payment allocation change request to update a payment allocation business object,
  a confirm payment request operation for sending a notification of a confirmed payment to a due item processing process component,
  a notify of payment operation for sending a notification of a payment to a business partner process component,
  a request clearing operation for sending a notification of a clearing request based on a payment allocation to the due item processing process component,
  a request clearing cancellation operation for sending a notification of a clearing request cancellation based on a payment allocation to the due item processing process component,
  a create bank statement operation for sending a bank statement creation request to update a bank statement business object,
  a create payment advice operation for sending a request to create a payment advice to update a payment advice business object in response to input from payment processing,
  a process lock box operation for sending a request to process a lock box to update an incoming check business object,
  a create cash payment operation for sending a cash payment creation request to update a cash payment business object,
  a cancel cash payment operation for sending a cash payment cancellation request to update the cash payment business object,
  a notify of payment operation for sending a notification of a payment to accounting,
  a notify of payment cancellation operation for sending a notification of a payment cancellation to accounting,
  a change clearing house payment order based on credit card settlement confirmation operation for sending a notification of a credit card settlement to update a clearing house payment order business object based, at least in part, on input received from settlement processing,
  a request credit card settlement operation for sending a notification of a credit card payment to settlement processing,
  a request check deposit operation for sending a notification of a check deposit to payment order processing,
  a request bill of exchange submission operation for sending a notification of a bill of exchange submission to payment order processing,
  a request payment order operation for sending a notification of a bank payment order to payment order processing, and
  a request file based payment order operation for sending a request for a file based payment order to payment order processing; and
  wherein the process components of the payment deployment unit are packaged together to be deployed on a single computer system;
execute the application-defined transaction for processing payment information; and
present data associated with the executed application-defined transaction for processing payment information to a graphical user interface.

14. The medium of claim 13, wherein the cash management process component comprises a liquidity forecast business object and an expected liquidity item business object.

15. The medium of claim 13, wherein the payment processing process component comprises an incoming check business object, a bank payment order business object, a house bank account business object, a cash payment business object, a bill of exchange payable business object, a check deposit business object, a bill of exchange book business object, a cash storage business object, a payment advice business object, a check storage business object, a cash transfer business object, a payment card payment settlement run business object, a payment register business object, a payment media run business object, a payment allocation business object, an outgoing check business object, a bank statement business object, a clearing house account business object, a clearing house payment order business object, a bill of exchange receivable business object, a bill of exchange submission business object, and a payment order business object.

16. The medium of claim 13, wherein the service operations associated with the cash management process component are grouped into service interfaces, the service interfaces comprising:
  a liquidity status out interface that includes the query liquidity status operation.

17. The medium of claim 13, wherein the service operations associated with the payment processing process component are grouped into service interfaces, the service interfaces comprising:
  a payment request in interface that includes the create payment reservation operation, the cancel payment reservation operation, the synchronous change payment reservation operation, and the change payment reservation operation;
  a payment request in interface that includes the create payment order operation and the cancel payment order operation;

a payment request out interface that includes the confirm payment request operation;

an outgoing payment advicing out interface that includes the notify of payment operation;

a payment accounting out interface that includes the notify of payment operation and the notify of payment cancellation operation;

a clearing in interface that includes the change payment allocation based on clearing request confirmation operation;

a clearing out interface that includes the request clearing operation and the request clearing cancellation operation;

a bank statement processing in interface that includes the create bank statement operation;

an incoming payment advicing in interface that includes the create payment advice operation;

a lock box processing in interface that includes the process lock box operation;

a cash payment in interface that includes the create cash payment operation and the cancel cash payment operation;

a credit card settling in interface that includes the change clearing house payment order based on credit card settlement confirmation operation;

a credit card settling out interface that includes the request credit card settlement operation;

a check depositing out interface that includes the request check deposit operation;

a bill of exchange submitting out interface that includes the request bill of exchange submission operation; and a payment ordering out interface that includes the request payment order operation and the request file based payment order operation.

18. The medium of claim 1, wherein the single computer system comprises a single physical hardware platform.

* * * * *